Feb. 26, 1946.  E. J. SVENSON  2,395,518
MATERIAL WORKING APPARATUS
Filed Dec. 31, 1935  17 Sheets-Sheet 5
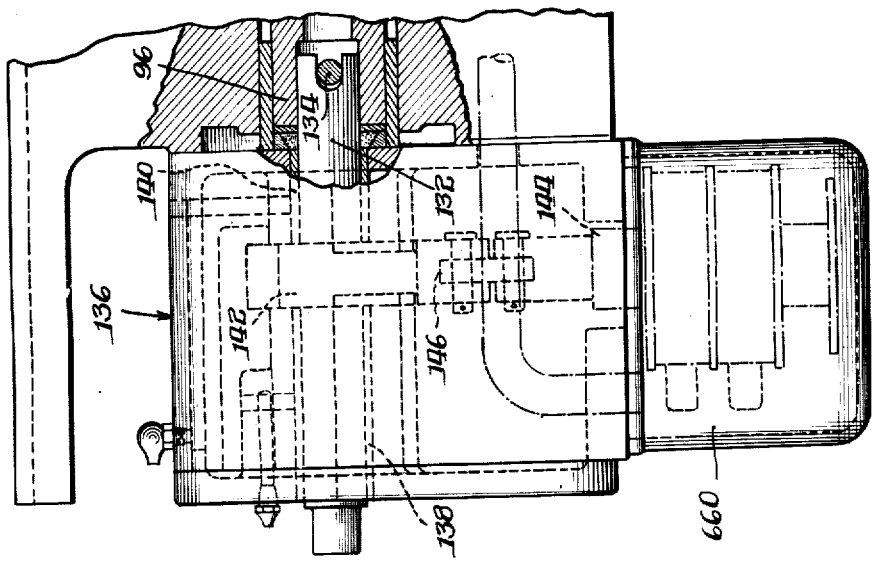
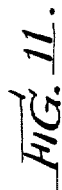
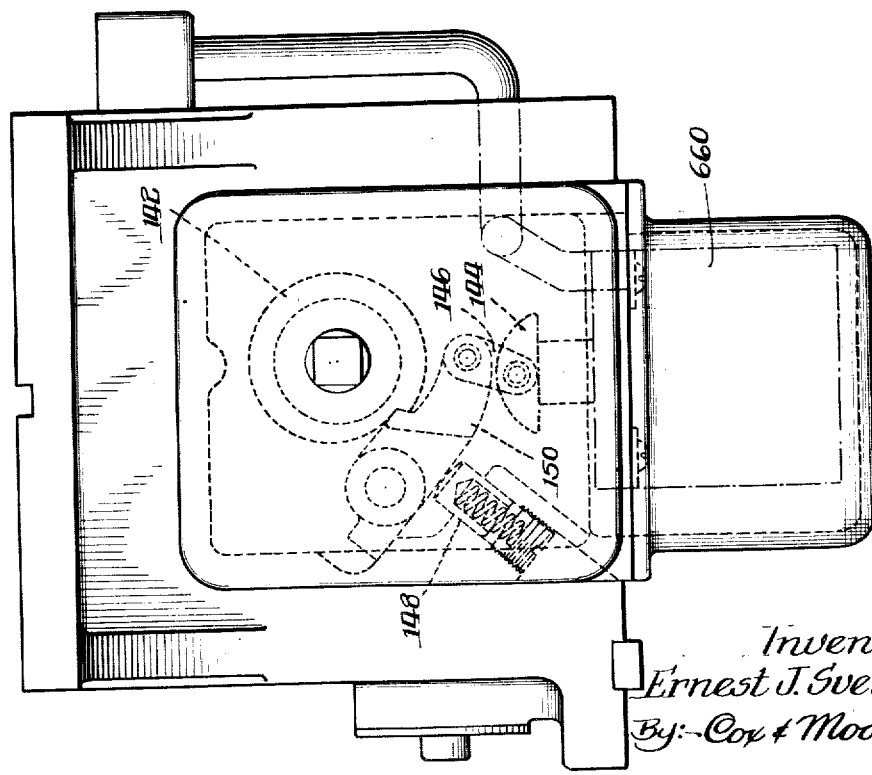

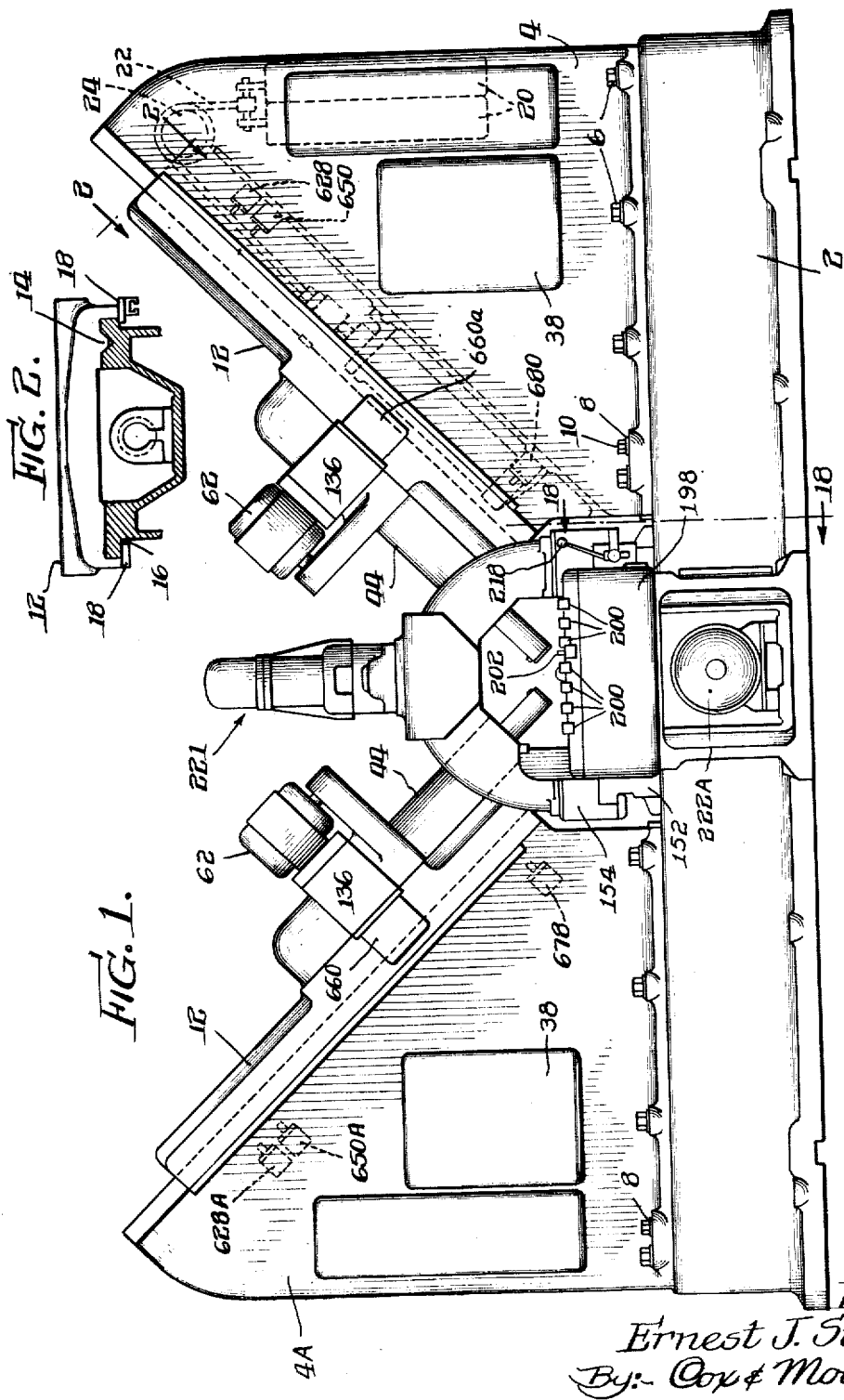

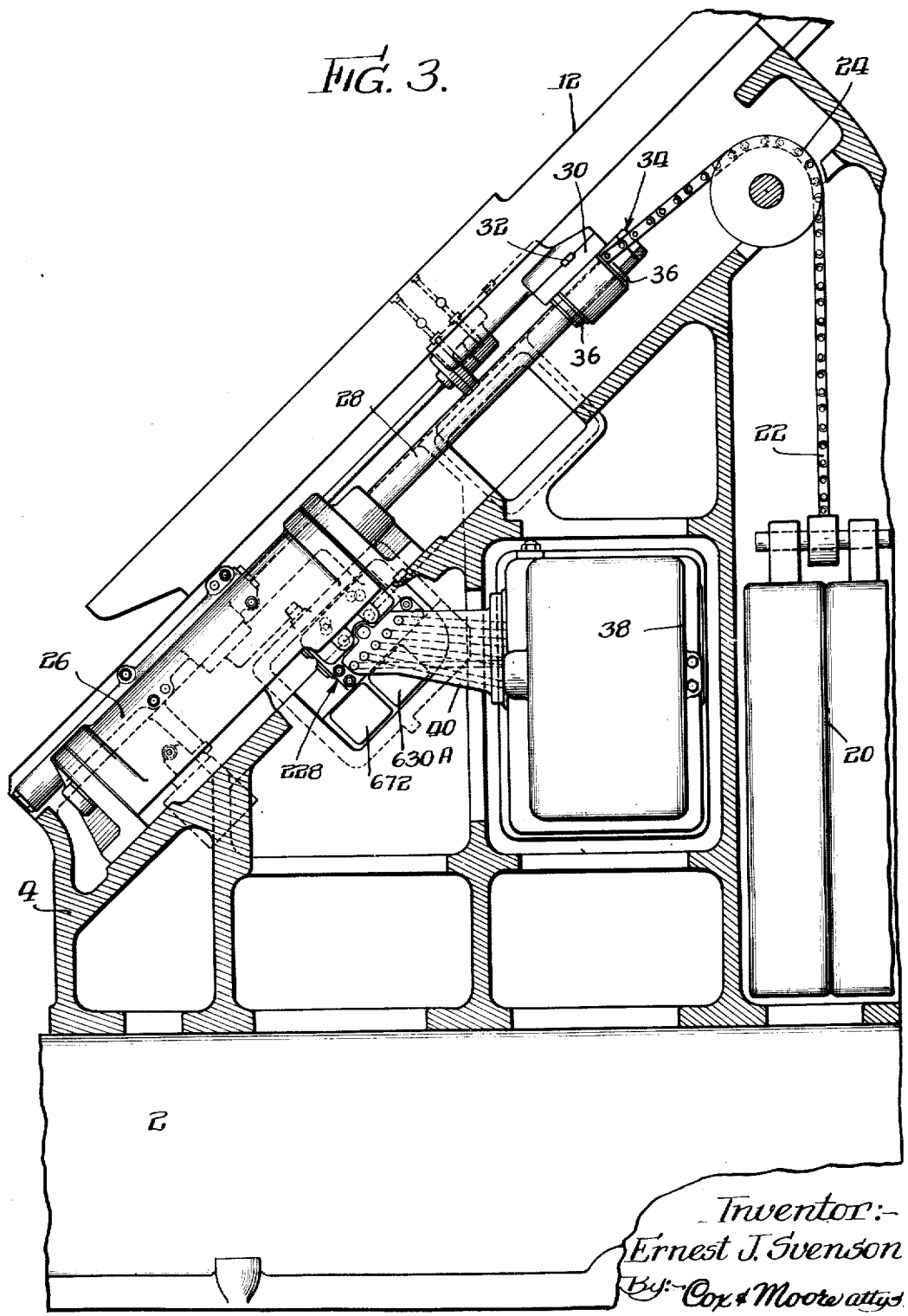

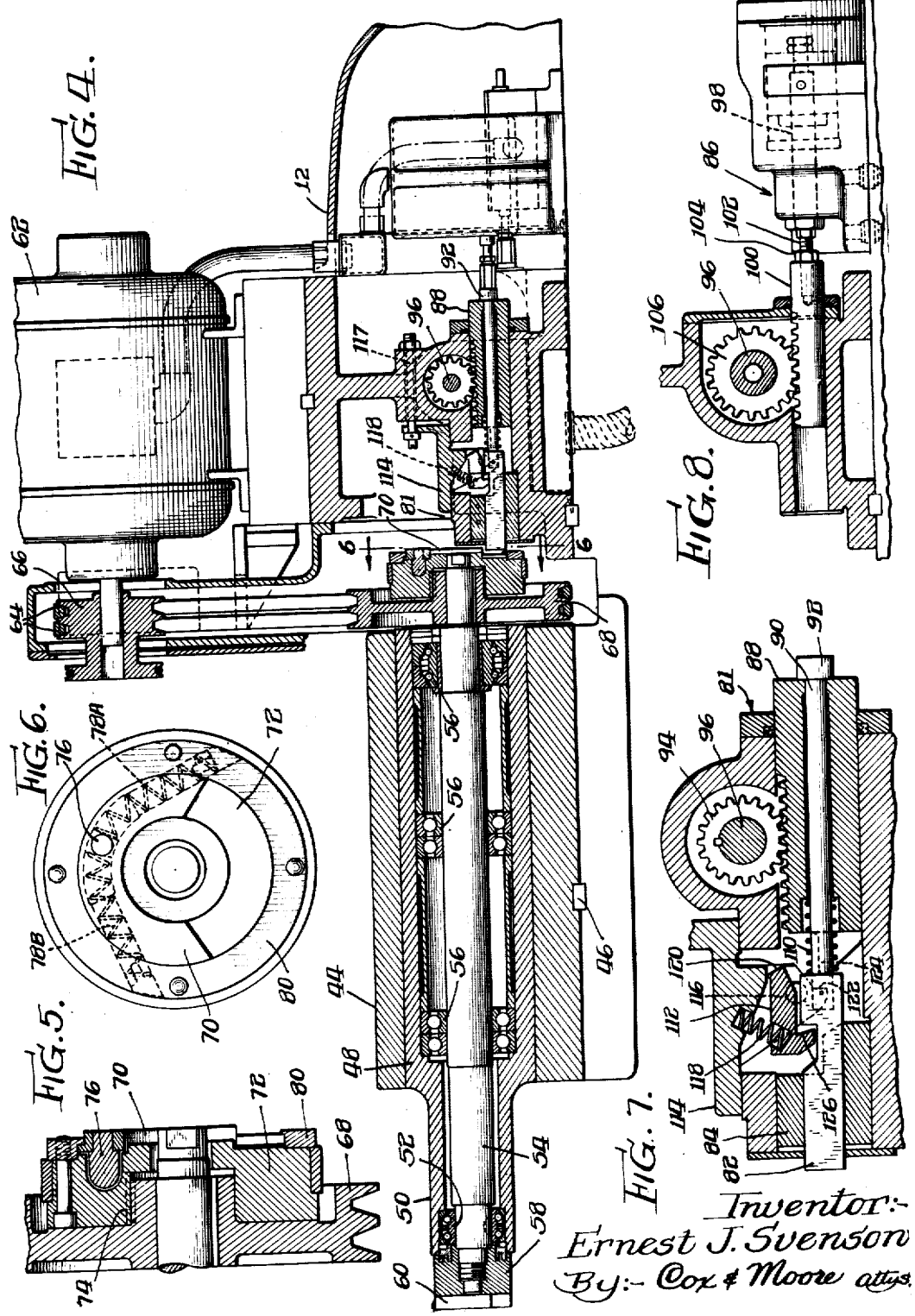

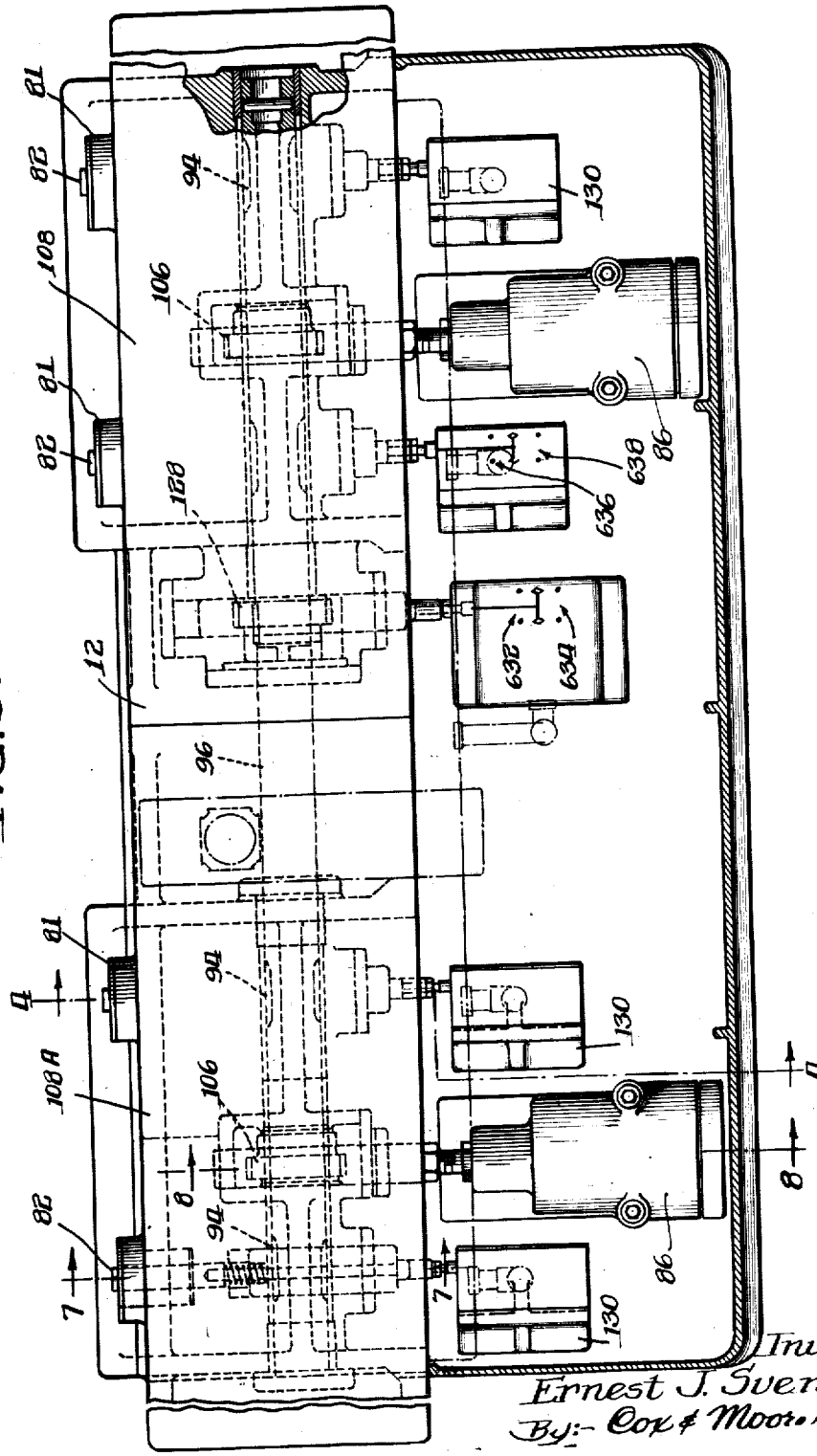

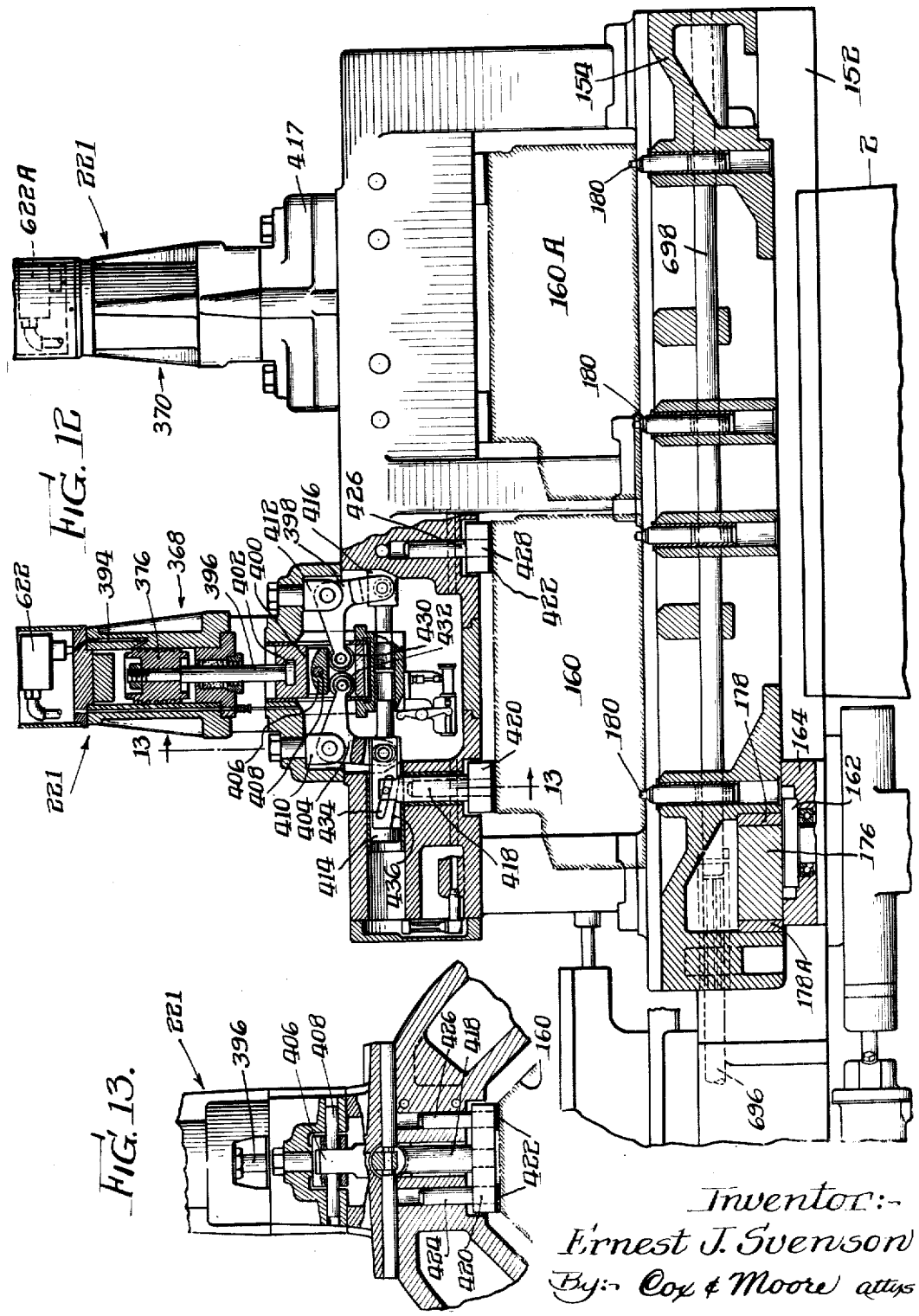

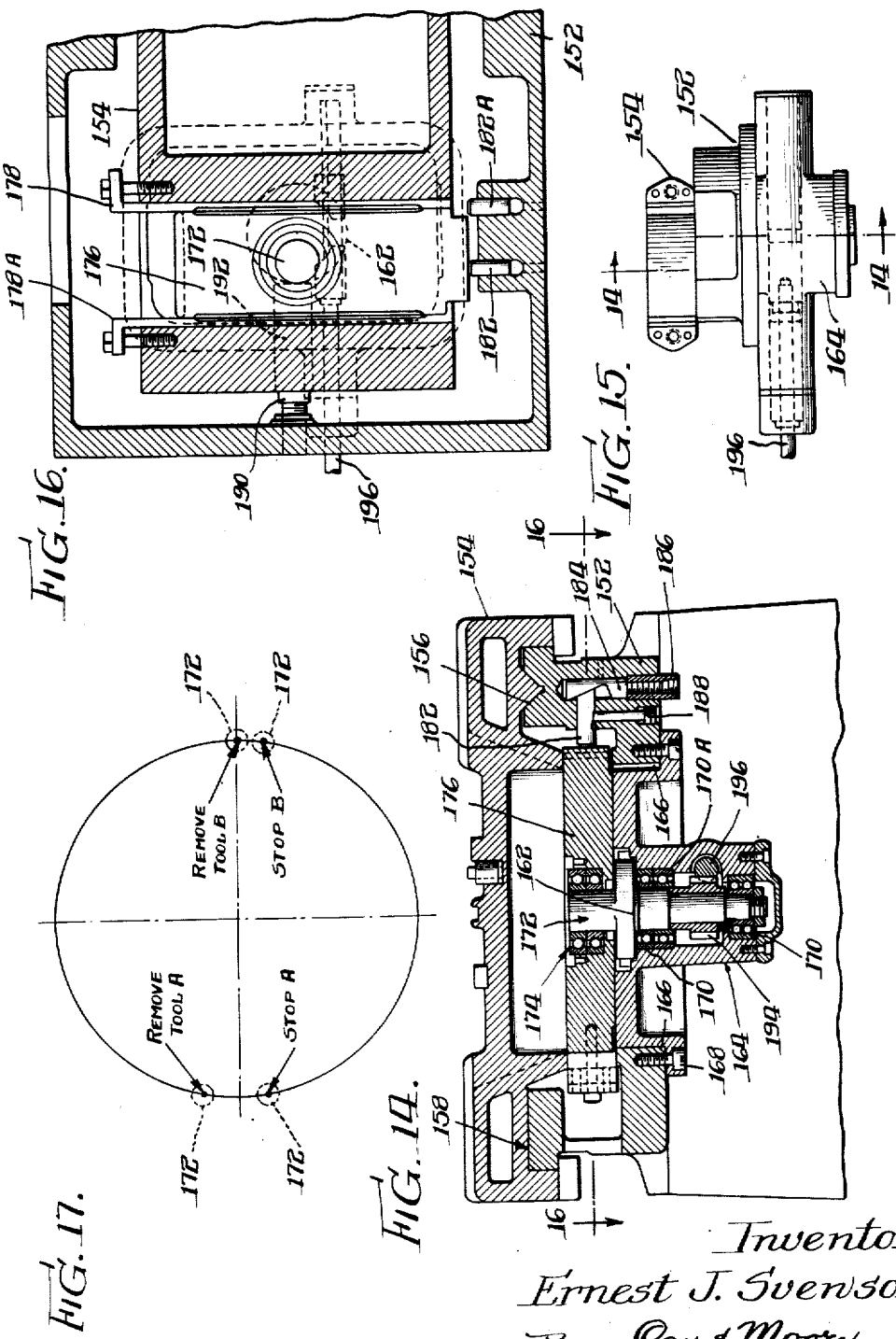

Feb. 26, 1946. E. J. SVENSON 2,395,518
MATERIAL WORKING APPARATUS
Filed Dec. 31, 1935 17 Sheets-Sheet 8
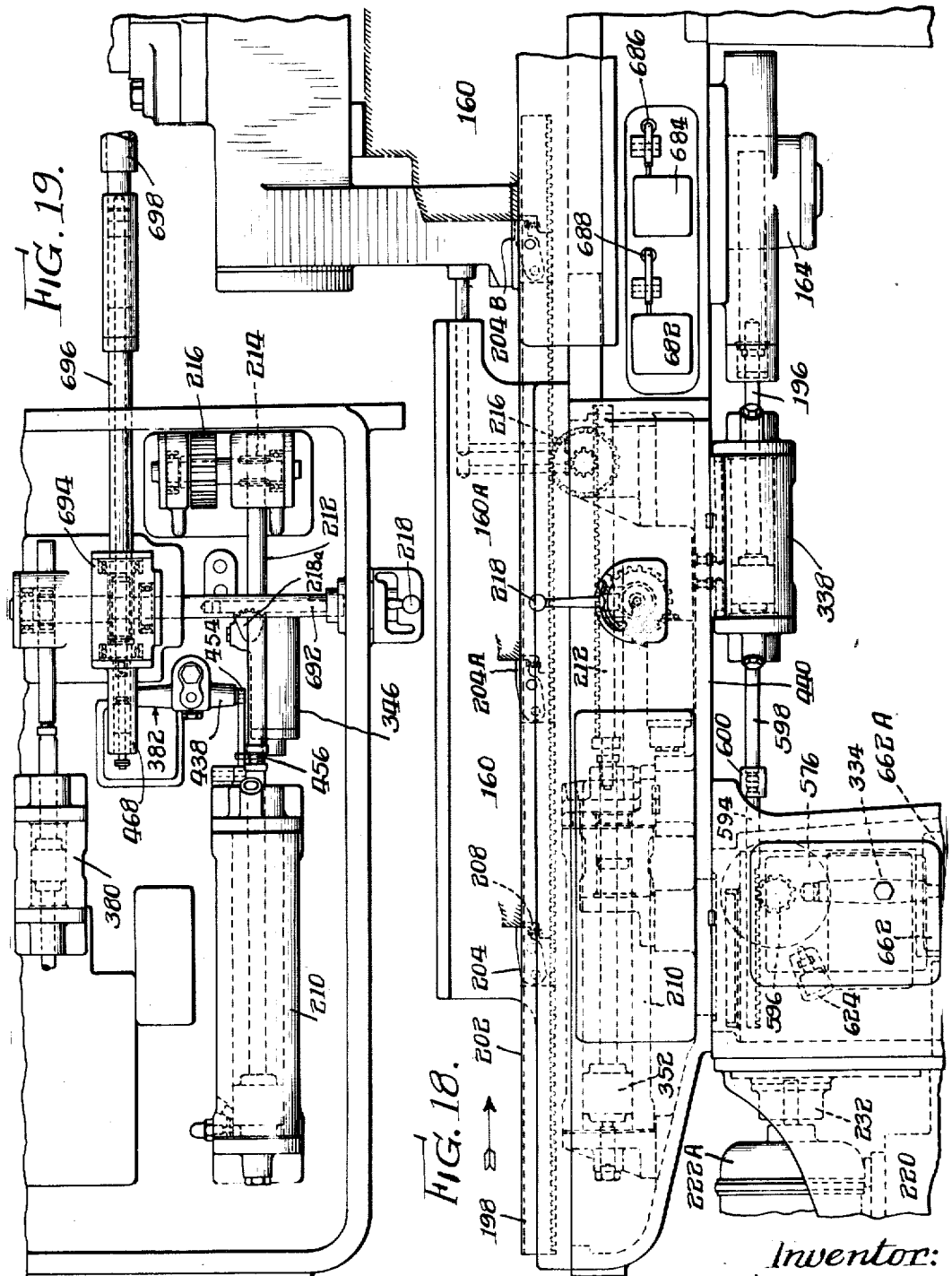
Inventor:
Ernest J. Svenson
By:- Cox & Moore attys

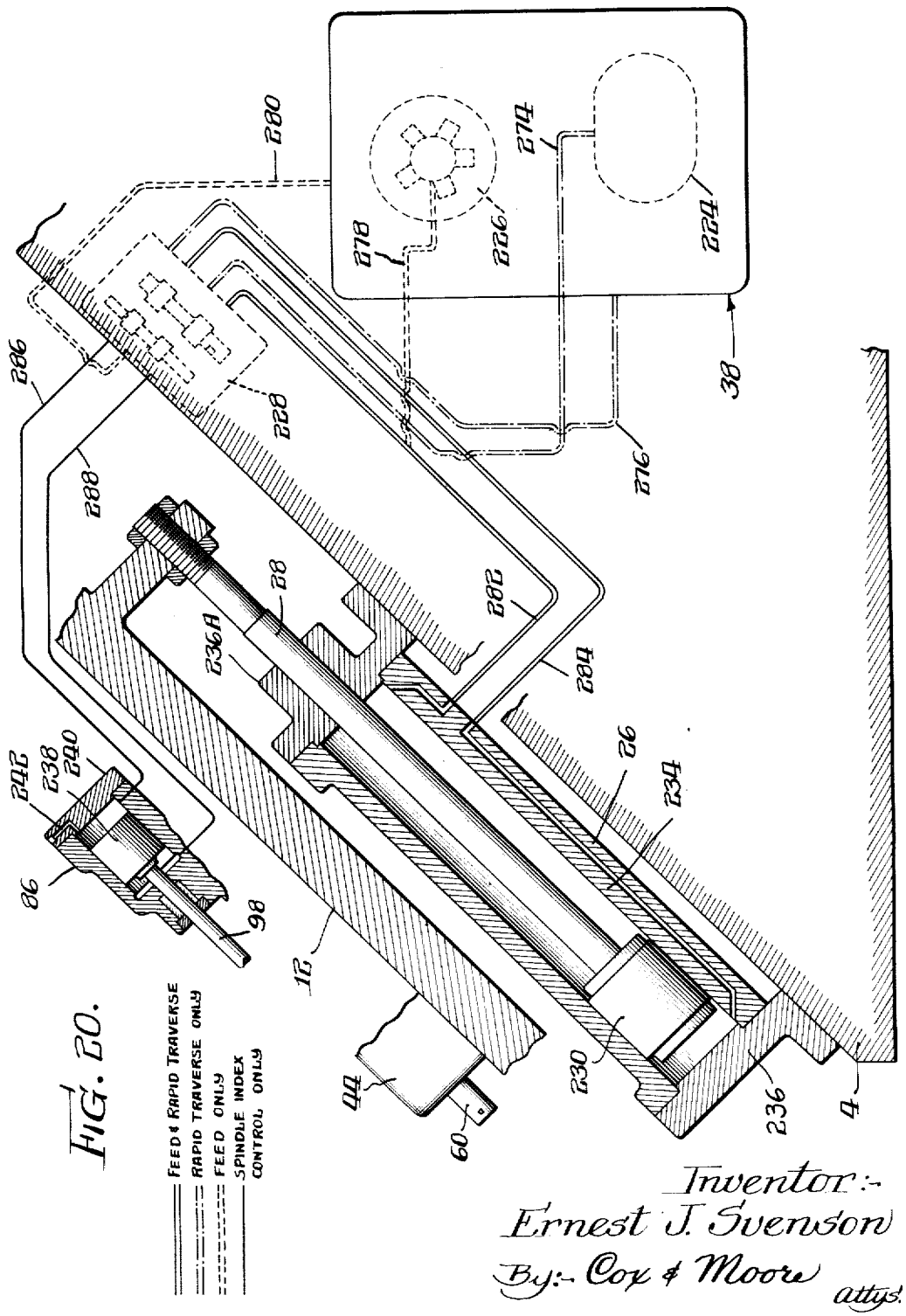

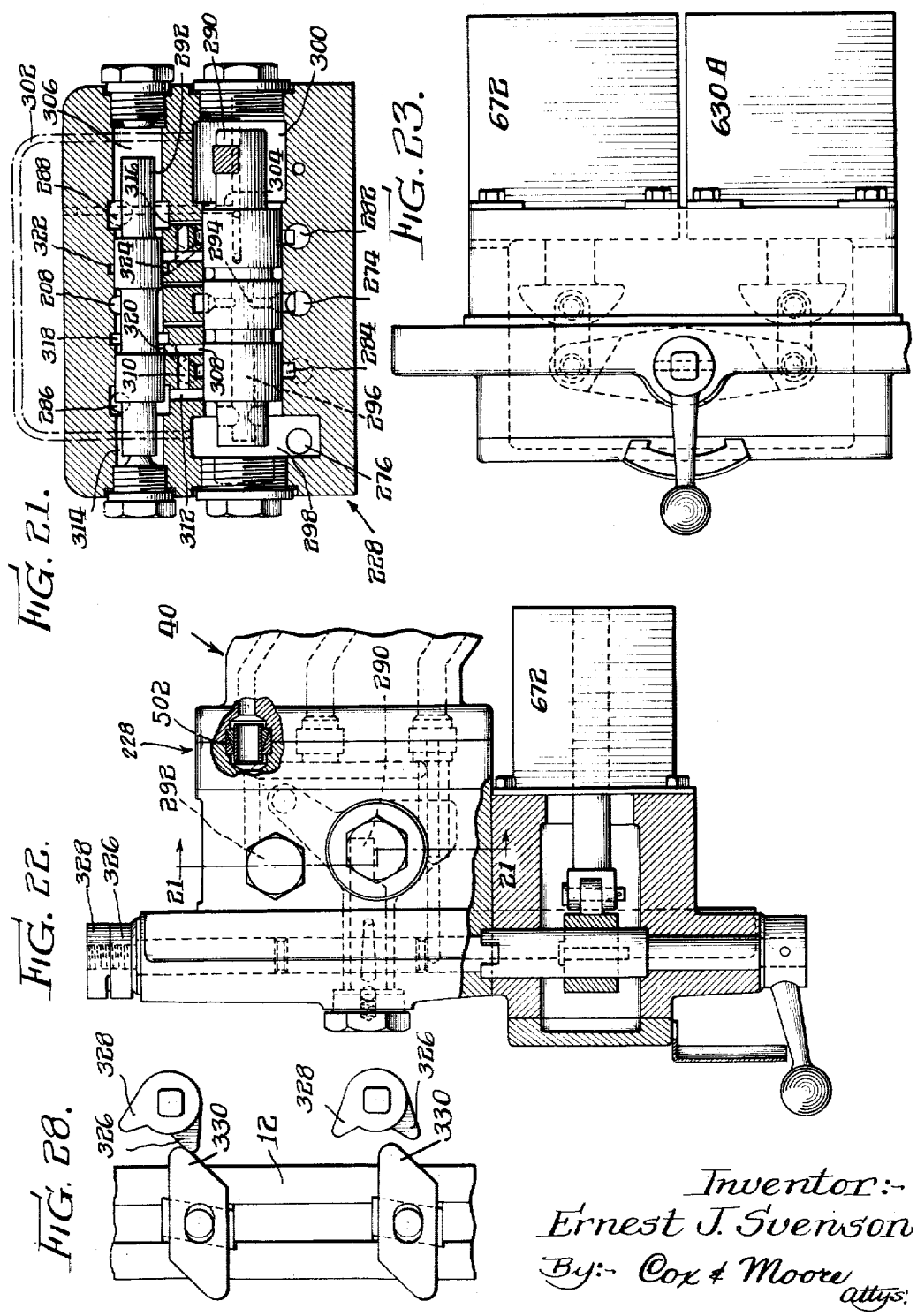

Feb. 26, 1946.     E. J. SVENSON     2,395,518
MATERIAL WORKING APPARATUS
Filed Dec. 31, 1935     17 Sheets-Sheet 11
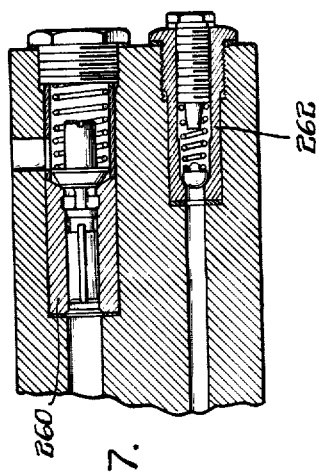
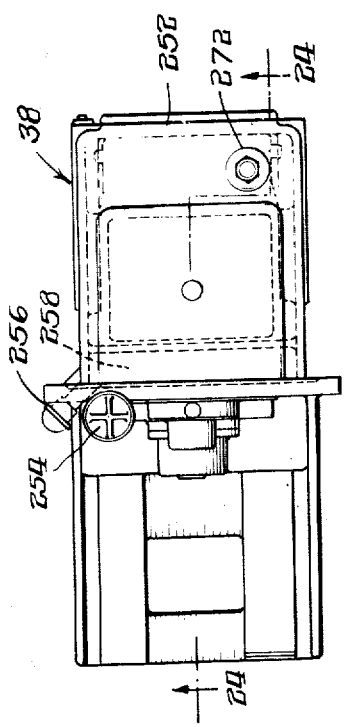
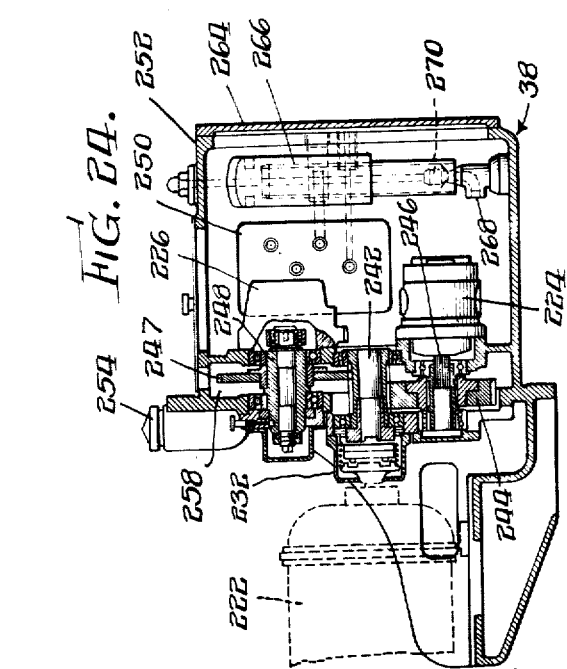

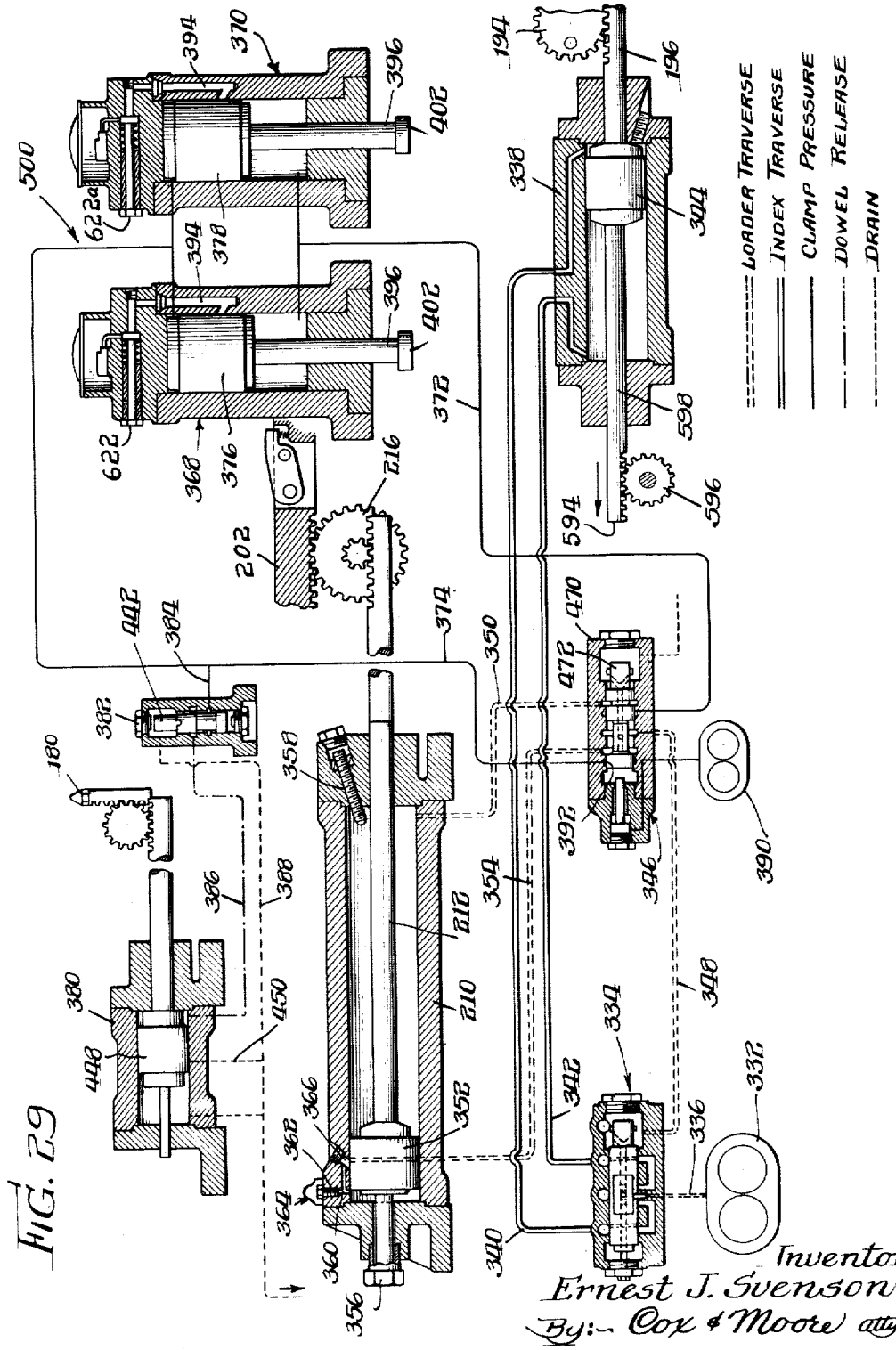

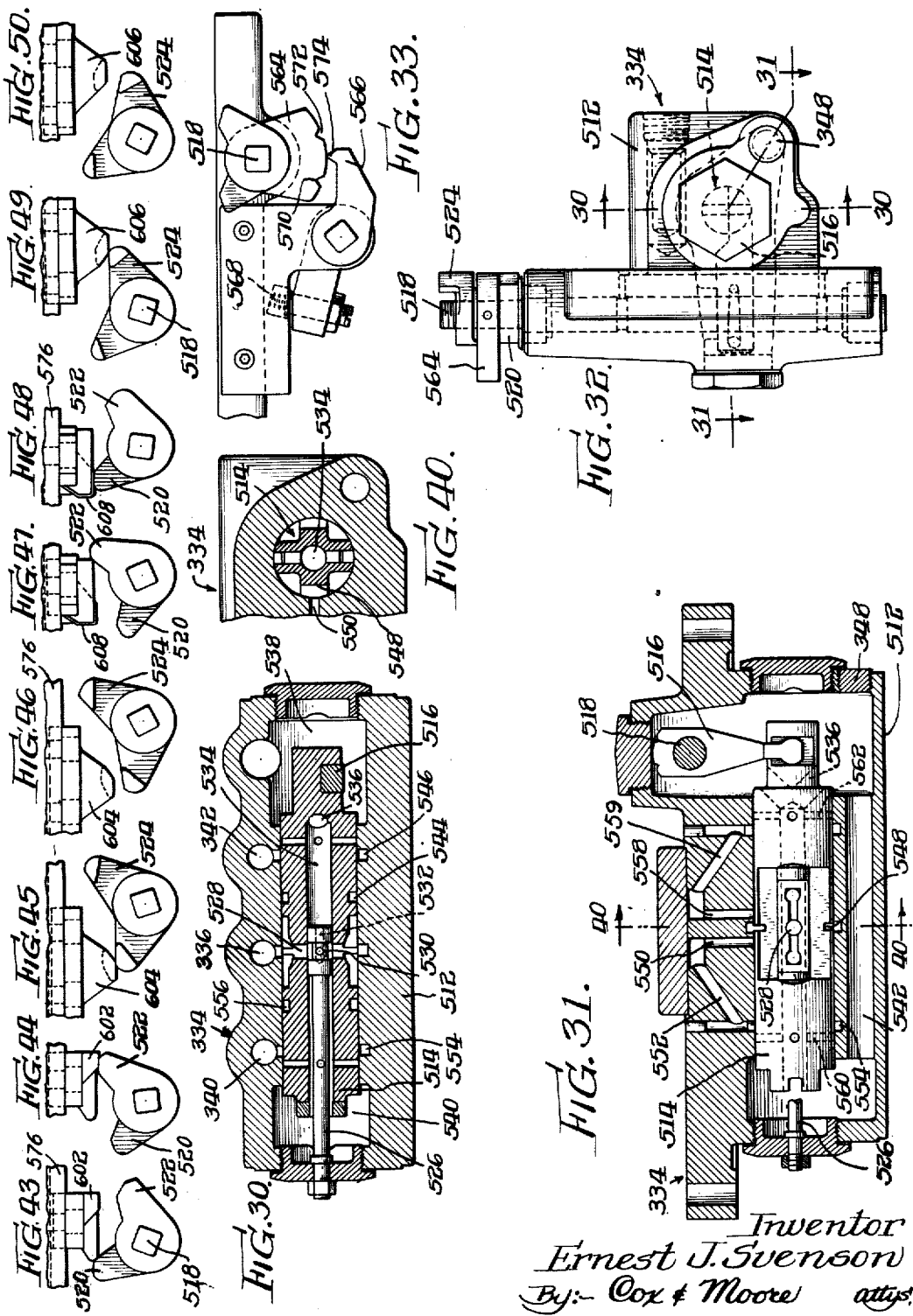

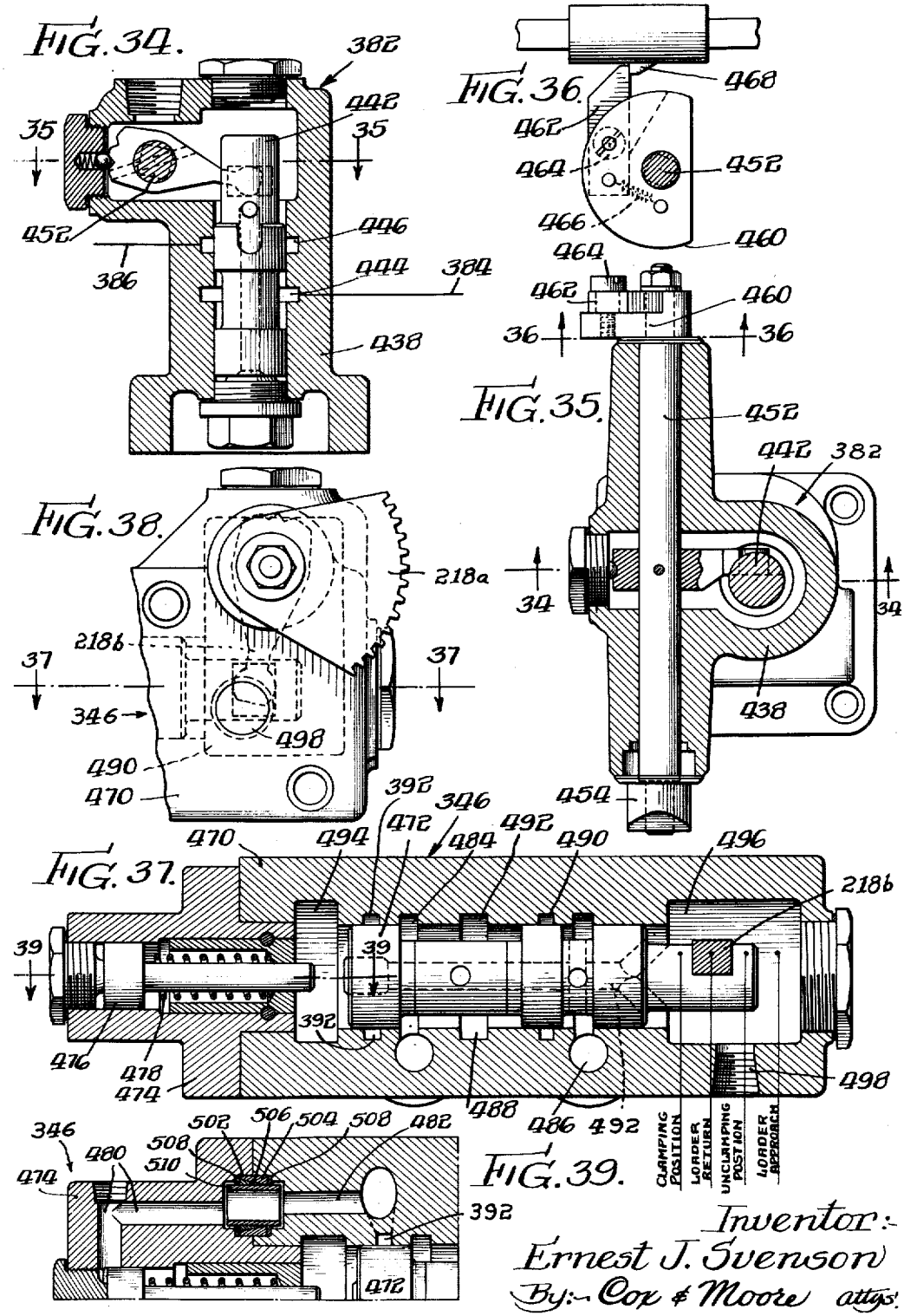

Feb. 26, 1946.  E. J. SVENSON  2,395,518
MATERIAL WORKING APPARATUS
Filed Dec. 31, 1935  17 Sheets-Sheet 15
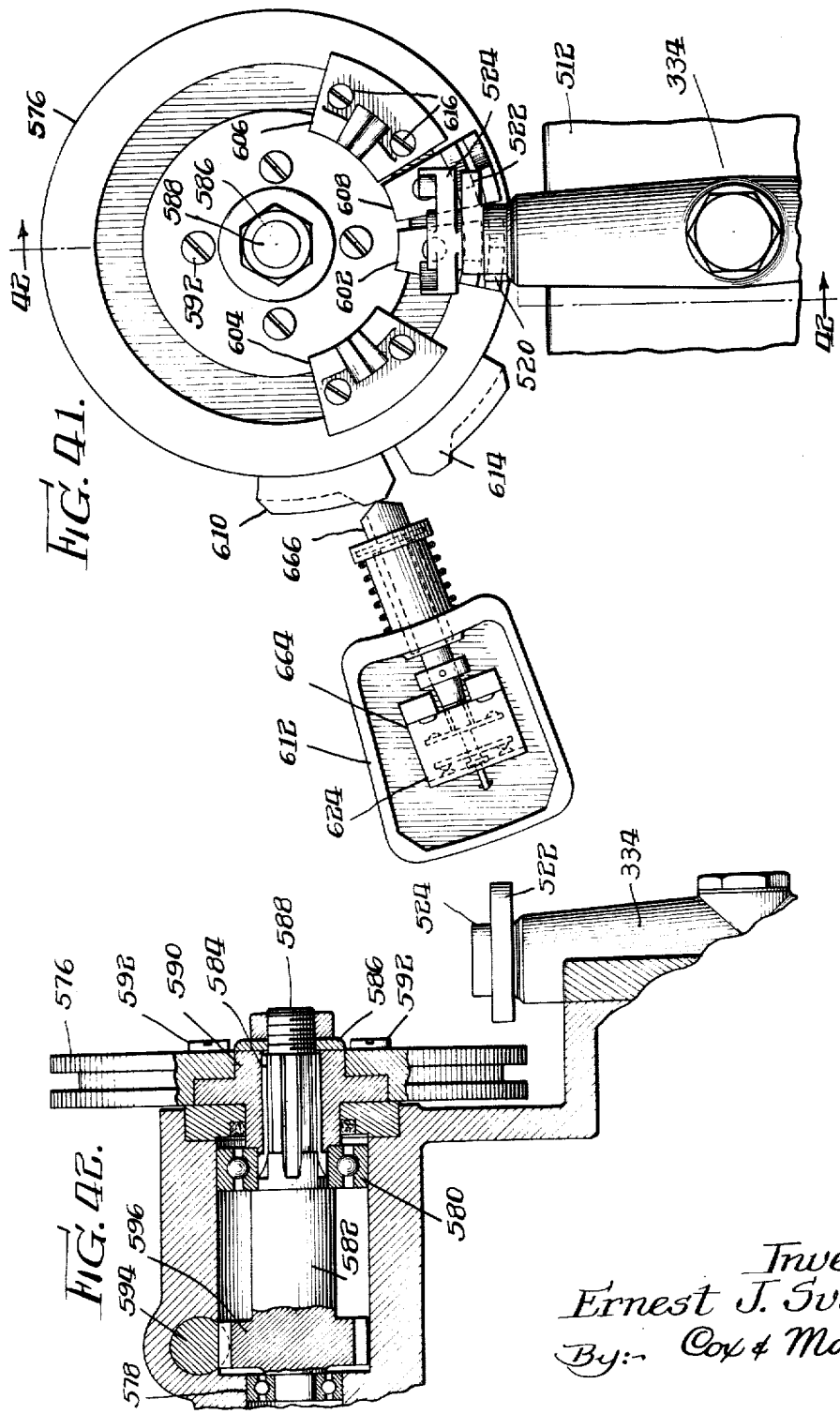
Inventor:-
Ernest J. Svenson
By:- Cox & Moore
attys.

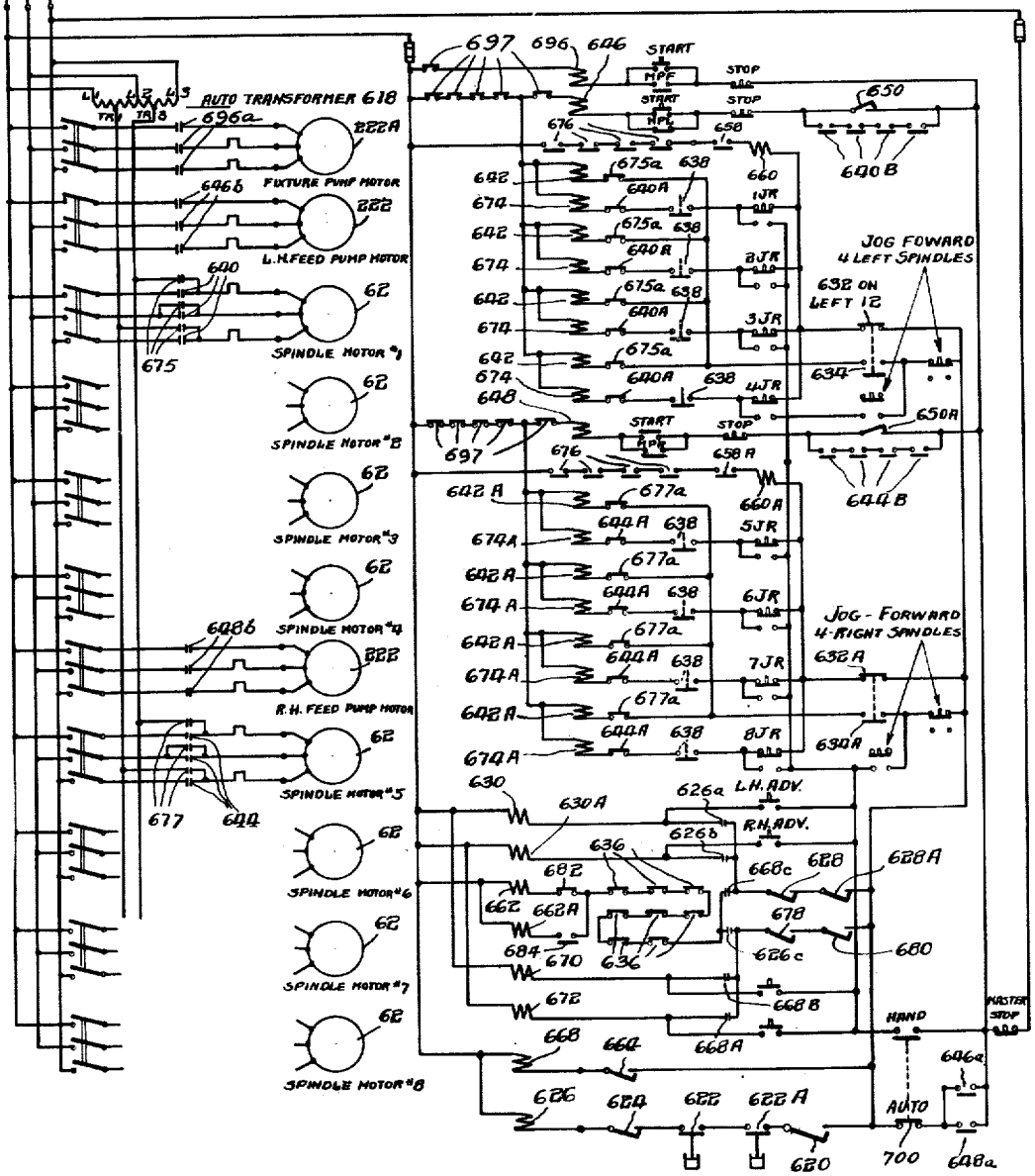

Feb. 26, 1946.     E. J. SVENSON     2,395,518
MATERIAL WORKING APPARATUS
Filed Dec. 31, 1935     17 Sheets-Sheet 17
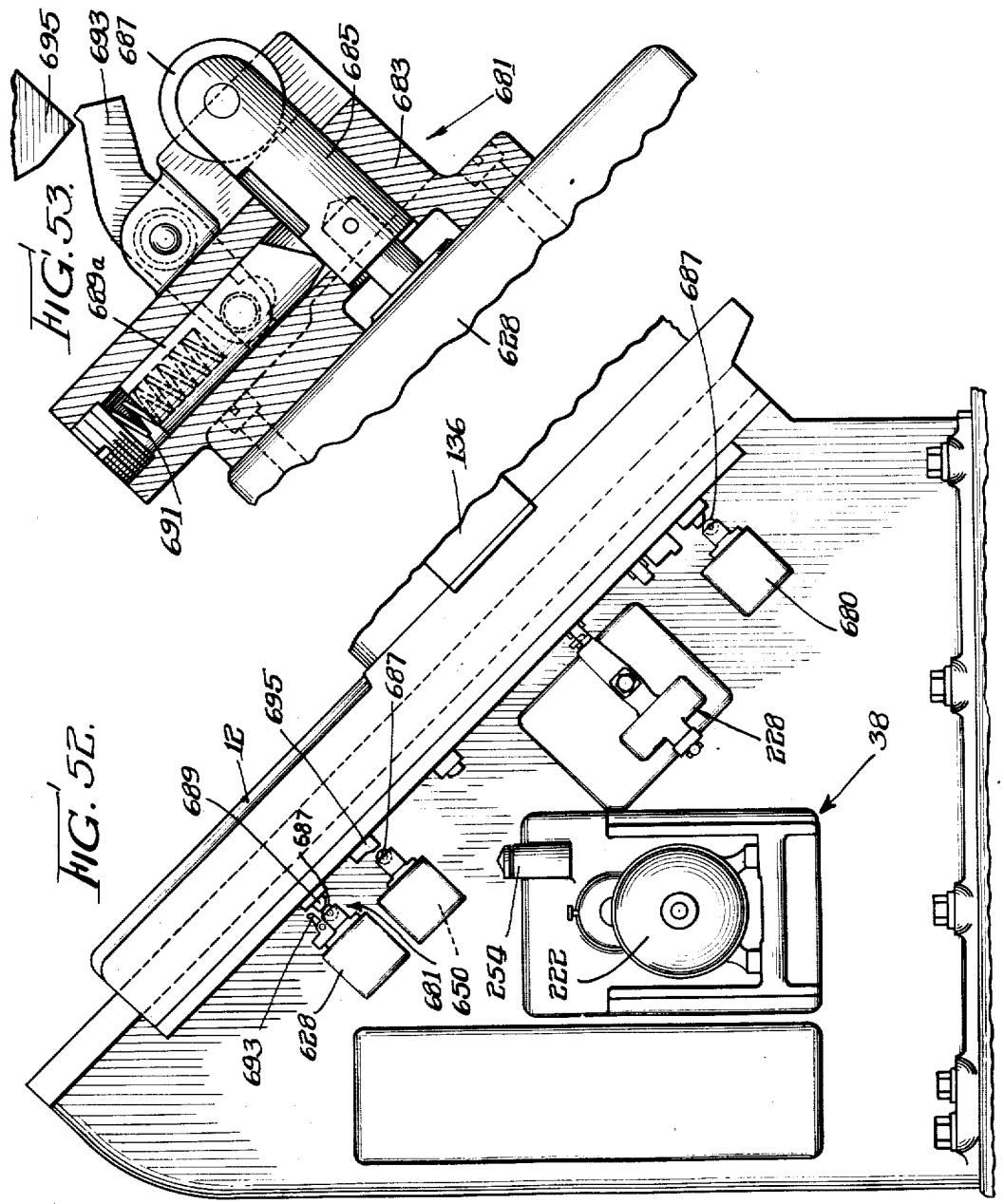
Inventor
Ernest J. Svenson
By: Cox & Moore
attys.

Patented Feb. 26, 1946

2,395,518

UNITED STATES PATENT OFFICE 2,395,518

MATERIAL WORKING APPARATUS

Ernest J. Svenson, Rockford, Ill., assignor, by mesne assignments, to Odin Corporation, Chicago, Ill., a corporation of Illinois Application December 31, 1935, Serial No. 56,935

43 Claims. (Cl. 77—1)

This invention relates generally to material working apparatus, and particularly to machines usually designated as boring machines.

It is an object of the present invention to provide a machine, as set forth above, which is far superior in functional and structural characteristics to commercial structures with which I am familiar and which were operating in the field prior to my invention. Due to certain inherent structural limitations in these prior machines, the accuracy with which they are capable of performing a metal cutting operation has not satisfied the requirements in the field of production. This is particularly true in such industries as the automotive industry where accuracy, coupled with speed of production, is of prime importance.

My invention contemplates metal working apparatus, embodiments of which in the form of diamond boring machines have been successfully operating in the field for a considerable period, whereby the degree of accuracy with which work parts may be machined makes it possible for the laboratory dream relating to machining accuracy of yesterday to become a reality of today.

It is a well-known fact that the expansion and contraction of metal parts and the like constitutes a vital factor when the requirement for extreme accuracy is of major importance—for example, measurements made at one time of the day may differ from the same measurements made at another time of the day, which differences result from temperature changes. It is also equally well known that to enable the uniform measurement of work parts, such measurement or gauging must be done at a uniform temperature; that is to say, the part measured must be at an exact temperature and the instrument, with which said part is measured, must also have an exact temperature. Likewise, those skilled in the art are aware that the instruments used for measuring during various manufacturing steps are accurate only in accordance with a given temperature. It is, therefore, another important object of the present invention to provide a metal working apparatus or machine which, when operated within a temperature controlled atmosphere, will enable work parts to be machined with extreme accuracy.

Another object of the invention is to provide a machine tool having structural characteristics which positively preclude heat from being imparted to the machined work parts through transmissions, such as hydraulic transmissions, electrical transmissions, and mechanical transmissions.

One type of machining operation, for which machines constructed in accordance with the present invention are contemplated, is that of machining or boring automobile cylinder blocks. It has been found desirable in the construction of cylinder blocks, in order to accomplish rapid cooling of said blocks, when in operation, to materially decrease the wall thickness of the cylinders and thereby reduce the amount of cooling space. This decrease in wall thickness has made the satisfactory machining of the cylinders impossible by the use of conventional boring machines and the like which were available prior to my invention, and of which I have had personal knowledge. That is to say, the forces imposed upon the relatively thin cylinder walls during the machining operation, when these conventional machines were employed, has been so great that distortion resulted and thus made it impossible to obtain uniform roundness of the cylinder wall. Attempts have been made to correct this non-uniform cross-section of the cylinder wall by processes known as "honing," but such processes have introduced other inaccuracies or errors—for example, in the production of a tapered cylinder wall. It is, therefore, an object of the present invention to provide a boring machine which is capable of accurately and quickly machining cylinder blocks having relatively thin walls, and to completely overcome the inaccuracies and disadvantages which have heretofore been experienced in the use of other conventional machine tools.

Experience has shown that one of the most vital factors in connection with the cost of manufacturing automobile parts and the like is that of "defective" parts. In fact, the cost of labor usually represents only a small fraction of the actual cost of the part produced when compared with the cost of material and the cost for "defective" parts. One reason for the production of "defective" parts is that many machine tools of conventional design are not equipped with a control which positively prevents an operator from shifting an element of the machine at the wrong interval in the sequence of operations. In other words, an adequate "step-by-step" control has not been provided. It is, therefore, an important object of the present invention to provide a "step-by-step" control which will make it impossible for an operator to cause the machine to perform operations other than in a predetermined sequence. In other words, the invention contemplates a machine which, when operated, cannot skip one or more sequences and thus produce scrap or defective parts.

A further object of the present invention is to provide a machine, as set forth above, made up of self-contained units. That is to say, a machine having sections or units so arranged that, when it is desired to use the machine in one environment, only one of the self-contained units need be employed, and, when used in other environments, all of said units may be employed.

Another object of the invention is to provide an arrangement of tool driving spindles which is such as to enable said spindles to be shifted and accurately secured in various spaced relationships, and which may be grouped in various numbers, depending upon the nature of the work to be performed.

A further object of the invention is to provide a machine capable of being operated by unskilled workmen, and to this end I propose to provide a single operating lever shiftable in a predetermined path so as to preclude any possible accidental or inadvertent shifting thereof.

My invention also contemplates in a material working apparatus of the type set forth above, the provision of novel automatic interlocks which preclude the necessity of relying upon human control after a cycle of operation has once been initiated.

The present invention is not limited to any particular machine tool, but contemplates embodiments capable of performing various metal removing operations, all of which are equipped with mechanical, hydraulic, and electrical control and operating mechanisms coming within the scope of my invention.

Another important object of the present invention is to avoid vibratory action which has heretofore been experienced with prime movers geared to spindles and the like, and to this end I propose to connect one prime mover directly to a cutter driving spindle by means of V belts known as synthetic rubber belts, such mechanism being combined with improved hydraulic fluid power means.

The present invention also contemplates material working apparatus, as set forth above, made up of various elements and units which may be removed and replaced by other elements as improvements thereof are made from time to time without in any way affecting the structure as a whole, or, in other words, without affecting the remaining elements or units of the machine. More specifically, I propose to provide an inclined column for supporting reciprocable spindles in such a manner as to in no way affect the inclination of a column oppositely disposed therefrom. Likewise a shiftable work supporting member is contemplated which is so arranged and constructed as to allow the use thereof in conjunction with any suitable cutting tools held by structures differing from those specifically shown in the present application.

The invention contemplates a new and improved carriage shifting transmission, which transmission incorporates a shifting element adapted to travel a relatively great distance as compared with the amount of movement imparted to the carriage during said movement of the shifting element. In this manner I am able to obtain very accurate shifting of the carriage, with the consequent accurate positioning of the work part to be machined.

It is a further object of the present invention to provide a material working apparatus, in which the hydraulic mounting of the hydraulic fluid pressure generating structures for the feeding and rapid traverse on a shiftable machine part not only presents a structure which prevents the transmission of heat from one part to another, but also which lends itself to the highest degree of simplicity in design and economy in maintenance. To this end I propose to provide a general control arrangement incorporated in such a manner as to not only function positively, but which is also of such simple design as to enable men of ordinary skill to understand and operate the structure. This applies likewise to the electrical elements which, because of their commercial or conventional nature, are known to those having ordinary skill.

It is another important object of the present invention to eliminate the necessity of using piping and the like for conducting fluid from one structure to another, and I have therefore provided a manifold arrangement equipped with one or more channels, and this manifold is so designed as to prevent leakage and to enable the convenient attachment thereof to other elements, such as valves and the like.

The invention also contemplates a new and improved structural arrangement for indexing the spindles, and enables the utilization of "low voltage plugging," which is very desirable in action because it prevents any forceful stopping of the spindles. Control means contemplated by my invention which, as stated above, are of extremely simple construction, may be governed in response to hydraulic action, and also in response to electrical action.

The foregoing and numerous other objects and advantages will be more apparent from the following detailed description when considered in connection with the accompanying drawings, wherein—

Figure 1 is a front elevational view of a metal working apparatus or boring machine, which is representative of one embodiment of the present invention;

Figure 2 is an enlarged transverse sectional view taken substantially along the line 2—2 of Figure 1 to more clearly illustrate the arrangement of the spindle supporting carriage and the support thereof;

Figure 3 is an enlarged fragmentary vertical sectional view of the column shown at the right of Figure 1 to more clearly illustrate the arrangement of the parts housed within said column;

Figure 4 is a central vertical sectional view of one of the tool driving spindles to more clearly illustrate the connection thereof with the prime mover and the arrangement of the indexing mechanism for said spindle, said view being taken substantially along the line 4—4 of Figure 9;

Figure 5 is an enlarged fragmentary sectional view of the index cam and associated parts, said view being the same as seen in Figure 4;

Figure 6 is an elevational view of the indexed cam and associated parts, as viewed from the right of Figure 5 and taken substantially along the line 6—6 of Figure 4;

Figure 7 is an enlarged central sectional view of the indexed plunger and associated driving mechanism therefor, taken substantially along the line 7—7 of Figure 9;

Figure 8 is a vertical sectional view taken substantially along the line 8—8 of Figure 9;

Figure 9 is a plan view of the left hand column taken normal to the incline thereof, the spindle supporting carriage being removed to more clearly disclose mechanism otherwise hidden;

Figure 10 is a rear view of the mechanism for controlling the timed actuation of the index plunger;

Figure 11 is an end view of said structure, as viewed from the left of Figure 10;

Figure 12 is a side view of the work clamping mechanism and associated parts, the left section of the work clamping structure being shown in central vertical cross section for the purpose of more clearly disclosing the operating elements of the clamping structure;

Figure 13 is an enlarged fragmentary vertical transverse sectional view of the clamping structure, taken substantially along the line 13—13 of Figure 12;

Figure 14 is a transverse sectional view of the work holding and supporting carriage and the carriage shifting mechanism or crank, said view being taken substantially along the line 14—14 of Figure 15;

Figure 15 is a fragmentary side elevational view of the crank mechanism for shifting the work holding and supporting carriage;

Figure 16 is a plan sectional view of said crank mechanism, taken substantially along the line 16—16 of Figure 14;

Figure 17 is a diagrammatic illustration of the orbit followed by the crank pin which shifts the work holding and supporting structure, the first position occupied by the pin being indicated as "Stop A," which is the position occupied by the carriage during the first machining operation; the second position occupied by the crank being indicated as "Remove Tool A," which is the position occupied by the carriage when the tool is removed following the first machining operation; the third position, indicated as "Stop B," designates the position occupied by the crank and the work holding and supporting carriage when said carriage has been shifted to the advanced position and the work located for the second machining operation; and the fourth position, indicated as "Remove Tool B," designates the position occupied by the crank and carriage when the carriage has been slightly shifted to permit the withdrawal of the tool; following this removal, the crank is again returned in counter-clockwise direction to the initial position indicated as "Stop A";

Figure 18 is a fragmentary side elevational view of the work loading portion of the machine, said view being taken substantially along the line 18—18 of Figure 1;

Figure 19 is a fragmentary plan view of the mechanism positioned immediately beneath the work loading table and actuator;

Figure 20 is a semi-diagrammatic illustration of the various fluid circuits for controlling the movement of the actuators for governing the indexing of the spindles and the longitudinal movement thereof, the lines employed for the various conduits being designated at the upper lefthand corner of the figure;

Figure 21 is a central sectional view of the valve mechanism for controlling the travel of the tool driving spindles, said view being taken substantially along the line 21—21 of Figure 22;

Figure 22 is a side elevational view disclosing the manner in which said control valve is coupled with a hand lever and with solenoids for automatically governing the shifting of the valve, as well as the fingers which are adapted to be shifted in timed sequence by suitable dogs;

Figure 23 is a view of the underside of the structure shown in Figure 22;

Figure 24 is a sectional view of the self-contained hydraulic fluid power generating structure, said view being taken substantially along the line 24—24 of Figure 25;

Figure 25 is a plan view of the unit shown in Figure 24;

Figure 26 is a side elevational view of the self-contained unit as viewed from the right of Figure 24;

Figure 27 is an enlarged fragmentary central sectional view of the fluid safety devices, said view being taken substantially along the line 27—27 of Figure 26;

Figure 28 discloses the arrangement of the dogs for operating the fingers connected with the control valve shown in Figures 21 and 22;

Figure 29 is a diagrammatic disclosure of the fluid circuits connected with the work loading, indexing, clamping, and dowel releasing mechanisms;

Figure 30 is a central longitudinal sectional view of the fixture valve, said view taken substantially along the line 30—30 of Figure 32, the valve being shown in its central or neutral position;

Figure 31 is a longitudinal sectional view of the valve, taken substantially along the line 31—31 of Figure 32;

Figure 32 is an end elevational view of the valve structure, as viewed from the right of Figure 31;

Figure 33 is an elevational view of the safety cam mechanism for securing the shiftable valve member shown in Figures 30 and 31;

Figure 34 is a central longitudinal sectional view of the dowel valve, said view being taken substantially along the line 34—34 of Figure 35;

Figure 35 is a transverse sectional view of the dowel valve and associated actuating mechanism therefor, said view being taken substantially along the line 35—35 of Figure 34;

Figure 36 is a transverse sectional view of the latching mechanism, taken substantially along the line 36—36 of Figure 35;

Figure 37 is a central longitudinal sectional view of the clamping and loading valve, said view being taken substantially along the line 37—37 of Figure 38;

Figure 38 is a plan view of the right extremity of the valve shown in Figure 37, said view disclosing the mechanism for positively shifting said valve;

Figure 39 is a fragmentary longitudinal sectional view of the clamping and loading valve, taken substantially along the line 39—39 of Figure 37;

Figure 40 is a transverse sectional view of the fixture valve, said view being taken substantially along the line 40—40 of Figure 31;

Figure 41 is an elevational view of the control drum;

Figure 42 is a transverse sectional view of the control drum and associated mechanism, said view being taken substantially along the line 42—42 of Figure 41;

Figures 43 to 50, inclusive, disclose various positions occupied by the cam members which govern the position of the fixture valve shown in Figures 30 to 32, inclusive;

Figure 51 is an electrical circuit diagram illustrating the electrical control arrangement which governs the timed functioning of the machine through each complete cycle of operation;

Figure 52 is a fragmentary rear elevational view of the column shown at the right of Figure 1 to more clearly illustrate the arrangement of the limit switches and actuating mechanisms therefor; and Figure 53 is an enlarged central sectional view of one of the actuating mechanisms associated with the limit switches shown in Figure 52.

Referring now to the drawings more in detail wherein like numerals have been employed to designate similar parts throughout the various figures, attention is directed to the fact that for the purpose of clearness in description, I shall describe various working units of the structures under the following headings:

Mechanical and Supporting Structures; Work Holding and Shifting Apparatus; Loading, Shifting, and Automatic Clamping; Hydraulic Structures—Feed and Rapid Traverse; Work Table—Shifting, Loading and Automatic Clamping; and Electrical Structure. These various units will be described in the order given and will be followed by a statement of operation.

Mechanical and supporting structures

Referring to Figure 1, a rigidly constructed base 2 rests on a suitable foundation and supports a "right hand" column 4, held in place by bolts 6 and maintained in proper alignment with respect to other structures, about to be described, by dowels 8, preferably two or more in number, said dowels being removable by nuts 10. A heavy carriage 12 is reciprocably mounted on the column and is guided and supported by a single V-type way 14, which is best seen in Figure 2. There is also a flat way 16 for the purpose of additional support. Gibs 18 are provided to maintain the carriage in proper relation to the ways during the relatively fast reciprocation of the carriage.

For the purpose of maintaining the carriage in proper balance due to the inclined position, a counterweight 20 is employed. It is preferable to make such counterweight of lead and connect the weight to the carriage by means of a strongly constructed roller chain 22. A suitable sheave 24 is rotatably supported on anti-friction bearings (not shown), and provides the connection together with the chain 22 and weights 20 for maintaining the carriage in balance on the ways.

The left hand column 4A is identical in structure to the right hand column 4 just described. For reciprocating the carriage 12, a fluid motor 26 (Figure 3) is employed and consists of a cylinder and piston structure which will be more adequately described under the heading "Hydraulic structures." At this point it is sufficient to say that the piston rod 28 is secured to a bracket 30 by nut 34 and floating collars 36. The bracket 30 is secured to the carriage 12 by a suitable number of screws (not shown). A key 32 is incorporated for taking substantially all the load during reciprocation of the carriage 12. A self-contained hydraulic fluid power generating structure or unit 38 is suitably secured to the column 4. A manifold 40 having a plurality of channels formed therein serves as fluid conducting means to a control valve 228, said valve also being suitably secured to the column 4. Detailed explanation pertaining to the last mentioned structures will be found under the heading "Hydraulic structures."

Referring to Figure 4, a spindle, and driving and control means for said spindle, are shown, it being understood that each carriage carries four such spindles in the particular machine shown. A spindle bracket 44 is suitably mounted on the carriage 12 by any suitable means such as bolts (not shown). A key 46 is employed for the purpose of properly locating said spindle bracket 44 and also for taking a major portion of the load imposed upon the spindle bracket. A structure, commonly known as a spindle quill 48, is supported within the bracket 44 in such a manner as to be easily removable, and any suitable means for clamping in a preselected position is contemplated. The over-hanging portion 50 of said quill 48 serves as the support for an anti-friction bearing 52. A cutter supporting spindle 54 is rotatably mounted within the quill 48 on a plurality of anti-friction bearings 56 located within the premises of the bracket 44. The spindle 54 has a cutter head 58 removably secured thereto in any suitable manner. The cutter head 58 supports a cutting tool of any suitable nature such as a tungsten-carbide cutter or a diamond properly mounted in a steel member. It will be seen that bearing 52 serves as the main support for the radial load caused by the aforesaid cutter head 58, and one of the bearings 56 serves as the main support for the thrust load to which the spindle 54 is subjected. For driving the spindle 54, a suitable electric motor 62 is used, one motor being provided for each spindle. Suitable V-belts 64, together with motor pulley 66 and spindle pulley 68, furnish driving connection between the motor 62 and the spindle 54. It should be understood that the speed of the motor 62 may be selected in a suitable manner to give a preselected speed to the spindle 54 and further, that a speed variation between said motor and said spindle is accomplished by the pulleys just referred to. These variable speed pulleys may be purchased on the open market, and hence a detailed description thereof is not necessary. If a more detailed description thereof is required, reference may be made to my copending application Serial No. 684,677, filed August 11, 1933 (see particularly Figure 28). This application has now issued as Patent 2,215,257, dated September 17, 1940. The belts referred to are of such construction as to preclude the transfer of any mechanical vibration from the motor to the spindle, as it is imperative that the spindle rotate as smoothly as possible.

The present disclosure of the spindle driving structure also requires means for properly indexing the spindle during withdrawal of the cutter 60 from the working part. This is accomplished by a co-acting mechanical-hydraulic and electrical arrangement, and at the present stage of the description, it is sufficient to merely direct attention to the mechanical structure utilized for said purpose. Figure 5 shows an enlargement of the pulley 68 associated with each spindle having an index cam 70 secured to the pulley by means of a cam support 72, key 74 and suitable screws (not shown). Further, spring abutment member 76 together with springs 78A and 78B allow the cam 70 to be rotatably resiliently secured to said cam support 72. Said arrangement can be best seen by referring to Figure 6. A retainer 80 maintains the cam 70 in assembled position. Figure 7 shows an enlarged section of a plunger mechanism 81 for each spindle for indexing the spindle in proper position and cooperating with the cam 70 just explained. A square plunger 82 is reciprocably mounted in a bushing support 84, and, by referring to Figure 4, the relative location of the plunger 82 and the cam 70 can be seen. For actuating the four plungers for each carriage in both directions, two fluid motors 86, Fig. 9, consisting of a cylinder and piston structure, are employed. Returning to Figure 7, a cylindrical rack member 88 for each plunger is shown supporting a rod member 90, which rod member has a head 92 and at its opposite end connects with the square plunger 82 in any suitable manner. A gear 94 meshes with the cylindrical rack member 88 in a manner to allow reciprocation when the gear 94 is rotated, and the gear 94 is mounted on a rotary shaft 96, which shaft can also be seen in Figures 8 and 9.

Referring now to Figure 8, it will be seen that a piston rod 98 of each fluid motor 86 connects to a cylindrical rack member 100 through the medium of screw thread coupling 102 and lock nut 104. Further, it will be noticed that the cylindrical member 100 meshes with a gear 106 fixed to shaft 96. The supporting brackets for the members shown in Figures 7 and 8 are best disclosed in Figure 9 and indicated generally by numerals 108 and 108A.

Referring again to Figure 7, a spring member 110 is interposed between each square plunger 82 and the cylindrical rack member 88; hence, it is possible to stop the square plunger 82 and actuate the cylindrical rack member 88. The object of this arrangement will be presently described. A trigger 112 is swingably mounted in a bracket 114 by means of a pin 116, and resilient means 118 urges said trigger 112 in a given direction. An abutment heel 120 on the trigger serves as a stop against the bracket 114, and another abutment heel 122 on the trigger serves as means to allow actuation by pointed portion 124, said pointed portion being part of the cylindrical rack member 88. The arrangement works in a manner so as to allow the stopping of the square plunger 82 during forward movement of rack member 88, and, after a certain further forward travel of the cylindrical rack member 88, the pointed portion 124 abuts the abutment heel 122 and thereby releases the trigger. The purpose of this arrangement will be explained later more in detail.

By referring to Figure 4, the bracket 114 is shown to be secured in an adjustable manner by screw arrangement 117 for the purpose of adjusting the timing of the release of the trigger hook 126 caused by the abutting action of the abutment heel 122 and the pointed portion 124. Referring to Figure 9, it will be seen that the square plunger arrangement 82 is disclosed in plan view. In fact, four such arrangements are shown, and the purpose is to have one arrangement for each spindle.

The explanation above relates to one unit arrangement for each spindle consisting of a spindle assembly, an electric motor and drive to said spindle assembly, control for properly indexing the spindle, and power means for actuating said control. It should be understood that any suitable number of such units may be employed in a material working apparatus as described, and the purpose of employing such a unit structure is to remedy an uncontrollable condition which is found to exist in material, such as cast iron and the like used in the construction of a carriage such as the carriage 12. To fully grasp the significance of the above, it should be realized that during the actual operating of the machine a certain amount of heat is generated by revolving members and the like, which results in a relative expansion of the material. If the structure is continuously operated for five or six days a week, twenty-four hours a day, and then stopped for one or two days, cooling of the structure takes place. The exact amount of contraction is not the exact amount of expansion taking place during the operation of the structure. It can, therefore, be seen that, under such circumstances, a continuous change between contraction and expansion takes place. The relative positions between the assemblies are changed, which is found to materially affect the interchangeable manufacturing process. The unit construction above described avoids difficulties in this regard. By interchangeable manufacturing process, I mean the shifting of the work part from one machine to another for performing operations on similar surfaces. Hence, it must be realized that all machines used must conform very closely with respect to spacing of the metal removing tools and the like.

To illustrate in a more clear manner the possibility of combining any number of spindles, I refer to Figure 9, which discloses one selected combination of spindles. The rotary shaft 96 may be made in one piece, as shown, and the gears 94 may be cut directly on the shaft. By comparison, it will be seen that the gears 106 are larger than the gears 94. This will be explained presently in describing the action of gear 128. Before leaving the above subject, it should be understood that the specific structure for actuating the shaft 96, such as the fluid motors 86, is merely one means of power actuation, and that any mechanical or electrical structure may take its place without deviating from the spirit of the invention. Further, two such fluid motors are shown merely for the purpose of maintaining the relatively long shaft 96 from deflections. Still further, a number of brackets 130 are shown for supporting what is commonly known as limit switches. It should be understood that one of said brackets is shown as companion to each unit, but it will be equally satisfactory to use only one for a multiple of units, provided the design of the motor 62 will permit of such an arrangement. In other words, said motor may be designed to withstand a low voltage current without rotation for a slight interval, which arrangement is more clearly explained under the heading "Electrical structure."

In Figures 10 and 11 I have shown a mechanism for controlling the timed actuation of the plungers 82. A shaft 132 is coupled with the rotary shaft 96 by means of a suitable coupling arrangement 134. The shaft 132 is supported by a bracket 136 and is rotatably mounted in bearings 138 and 140 within said bracket. A cam 142 is suitably mounted on the shaft and coacts with a trigger cam 150 for the purpose of stopping the actuation of the shaft 132, and hence the shaft 96 at a preselected interval. A magnetic actuator 144 is connected to the trigger cam 150 in any suitable manner, such as by the link member 146. A resiliently actuated plunger 148 maintains the trigger cam 150 in contact with the cam 142. It should be understood that, when the magnetic actuator 144 is energized, the aforesaid two cams 142 and 150 are separated, and more detailed description is found under the heading "Electrical structure."

*Work holding and shifting apparatus*

I shall now describe the work holding and shifting apparatus, and it should be understood that my invention is, by no means, limited to said work holding apparatus in combination with the machine apparatus as heretofore described, and that I aim to cover, in the present application, the apparatus of both kinds individually and also in combination. Referring to Figure 12, a work holding base 152 is secured to the base 2 in the manner previously explained in connection with the column 4. A work holding and supporting carriage 154 is shiftably mounted on the base 152 and, by referring also to Figure 14, it will be seen that way arrangements 156 and 158 are identical with those described in connection with the carriage 12, and that the way arrangement 156 compares with the V-type way 14, and that the way arrangement 158 compares with the flat way 16. Therefore, the description of said carriage 12 is sufficient. Two work parts 160 and 160A, known as "V-type cylinder blocks," are shown for the purpose of illustrating one of the environments in which my invention is now being used.

Before describing in detail the shifting of said work holding and supporting carriage 154, and to enable those skilled in the art to more fully appreciate the arrangement shown, I wish to state that the shifting of the work parts from one position to another must be so accurate that, during the machining thereof, even the slightest variation, due to compression or elongation of material of the mechanism used in shifting would render the structure unsatisfactory. I have disclosed, and shall presently explain, a structure which has proved itself to be so accurate that, in boring cylinder blocks for several months in production shops, the present day method of measurement has failed to register any errors in the dimension of the bore in the blocks which were commercially produced.

Referring now in more detail to Figures 12 to 17, inclusive, a crank member 162 is mounted in a stationary housing 164, which housing has a metal-to-metal contact at 166 with the work holding base 152. A number of screws 168 are used for securing said housing 164 to said work holding base 152. Anti-friction bearings 170 and 170A of the pre-loaded types are used for maintaining said crank 162 in rotatable manner and at a predetermined preload. The bearings are of similar design disclosed in my co-pending application, Serial No. 391,130, filed September 9, 1929. A crank pin 172, preferably integral with the crank 162, engages through another set of anti-friction bearings 174 similar to those just described. A slide member 176 carries the bearings 174 and as it is moved in a orbital path by the crank pin shifts the work holding and supporting carriage 154 through the medium of adjustable taper gibs 178 and 178A carried by the carriage. The arrangement of said taper gibs is such that not only is it possible to eliminate all the play, but it can also be seen that the gibs are used for the purpose of accurately positioning, locating dowels 180, which locate the work parts 160 and 160A in proper relation to the cutting tools 60.

Figure 17 diagrammatically illustrates the action of the crank 162 when shifting the work holding and supporting carriage 154 into a plurality of positions from one cutting position, indicated as Stop A, to another cutting position, indicated as Stop B, and back to the original position of Stop A. To positively position the slide member 176 in the aforesaid two positions, Stop A and Stop B, two positive stops 182 and 182A are used. Each stop has suitable adjustment through an adjusting member 184, which is shiftably positioned by differential nut arrangement 186, and, after proper adjustment is made, the positive stop is held by a lock screw 188. The purpose of arranging the aforesaid stops 182 and 182A in a manner as shown is to preclude any possible deformation to take place, including a possible misalignment of the way arrangement 156. An adjustable stop member 190 on base 152 coacts with a plunger 192, which is resiliently positioned in the work holding and supporting carriage 154. Similar means is provided at each end of the carriage. The arrangement is found to be very beneficial and to allow a slight preload when the work holding and supporting carriage 154 is in either stop position A or stop position B. Further, by referring to Figure 17, the crank is "over the center" a certain amount when in Stop A or Stop B position. Therefore, the preloading arrangement, as just described, also serves as a holding means in cooperation with the positive stop members 182 and 182A, when there is a tendency to shift the work holding and supporting carriage 154 in one direction or the other without the utilization of the aforesaid crank arrangement. A rack and pinion arrangement 194 and 196 is used for actuating the crank from one position to another in a manner as described under the heading "Hydraulic structures." The action of shifting from one position to another will also be explained under the above heading, and further, under the heading "Electrical structure."

*Loading, shifting and automatic clamping*

For the purpose of more clearly disclosing the power loading, shifting and automatic clamping of the work parts, the structure used for said purpose will now be described. Referring particularly to Figures 12, 18 and 19, it is assumed that the two work parts 160 and 160A are placed on a loading platform 198 on suitable hardened members 200 (Figure 1). A loading actuator 202 has a multiple of trigger arrangements 204, 204A, and 204B. Said trigger arrangements are suitably mounted for action in a manner as to engage the work parts 160 and 160A when loading actuator 202 is actuated in a loading direction, as shown by the arrow, and to be allowed to be depressed against spring 206 when loading actuator 202 is actuated in the reverse direction. Further, assume that two work pieces shown in Figure 12, which have previously been machined, are ready to be removed from the work holding and supporting carriage 154. A hydraulic actuator 210 furnishes the propelling mechanism through rack member 212 and speed-up gearing 214 and 216, said gear 216 meshing with gear teeth on the bottom side of said loading actuator 202. Through the proper manipulation of manual control lever 218, the work parts to be machined and located on said loading platform 198 are transferred into position and located on said work holding and supporting carriage 154, and the other work parts 160 and 160A already machined are transferred to a suitable receiving conveyor (not shown). To more fully understand the great saving in labor and the expedient handling of the parts, reference is made to article appearing in Automotive Industries for July 27, 1935, which describes the conveyor system used in conjunction with my invention. The work parts are now ready to be finally located through the locating dowels 180 and clamped by a mechanism referred to as a clamping unit 221. The details are associated with electrical and hydraulic structures and will, therefore, be described later in conjunction with said structures.

Hydraulic structures—Feed and rapid traverse

Figure 20 discloses diagrammatically the feed and rapid traverse arrangement for propelling the carriages, the actuator for one carriage being shown; and for operating the actuators 86. In illustrating the elements involved, I have employed the diagram used in the actual construction and maintenance of said arrangement. The unitary structure 38 provides a support and housing for pumping means used to generate the required fluid power. A relatively large displacement pump 224 provides a large volume of fluid for the purpose of imparting rapid shifting to the carriage 12. Another pump 226, preferably of the plunger type and fully disclosed in my co-pending application, Serial No. 684,677, filed August 11, 1933, now issued as Patent 2,215,257, is incorporated for the purpose of imparting slow feeding action to the carriage when a metal removing process takes place. Said pumps are hydraulically coupled with the valve 228, the functional characteristics of which are fully disclosed and described in my copending application, Serial No. 627,025, filed July 30, 1932, now issued as Patent 2,363,707, dated November 28, 1944. Details of said valve are shown in the enlarged disclosures of Figures 21, 22, and 23. The fluid motor 26 consisting of piston 230, the piston rod 28, cylinder 234 and brackets 236 and 236A serves as an actuator for imparting various movements to the carriage 12 in both directions. The two indexing actuators 86 for each carriage are connected to the valve 228 in a manner as will be later explained. Each indexing actuator consists of the piston rod 98, a connected piston 238 and an end cap 240, said end cap 240 having a channel 242 for the purpose of checking pressure in the indexing actuator 86. Each actuator 86 is suitably secured to the carriage 12, as clearly disclosed in Figure 9. To facilitate an understanding of the diagram, each fluid channel is illustrated by a special form of line, an index to said lines being shown in the upper left hand corner of Fig. 20. To enable a man skilled in the art to quickly understand said self-contained hydraulic fluid power generating structure or unit 38, I have employed Figures 24, 25 and 26 which disclose in detail the particular arrangement of the pumping means for generating the fluid power. In mounting the structure in either column such as the column 4, as clearly shown in Figure 3, it is a simple matter to maintain the structure in the field. Further, it enables the use of the manifold arrangement 40 and precludes common pipes or tubing which have in the past given considerable trouble due to leakage and vibration. Still further, there is no transfer of heat which would have a tendency to jeopardize the proper accuracy of the mechanical operating structure. In fact, in checking the structure in the field, when running continuously twenty-four hours a day, the heating at a point where the structure is secured to the column is only 5° to 7° above the actual room temperature. Worthy of mention also is the manner of locating the different elements within the structure so that any portion or element of the structure is accessible and removable without disturbing and removing other structures or elements. It should also be understood that the structure must operate without any vibration whatsoever; therefore it is also necessary to incorporate the pump prime mover in a supporting manner directly in the unitary structure, and such prime mover 222 can be seen in Figure 24. The outline of such motor or prime mover is indicated in Figure 24. The prime mover 222 is drivingly connected to the pump 226 and the pump 224 through proper gears which are preferably of non-metallic structure in order to preclude any vibration. A coupling 232 having rubber driving arrangement connects the prime mover 222 directly to drive pinion 242. Gear 244 imparts the driving action to the pump 224 through proper spline coupling 246. Suitable anti-friction bearings are incorporated for mounting said drive pinions 242 and 244. Gear 247 provides the drives for the pump 226 and the variable stroke adjustment 248, which elements are clearly disclosed in my aforesaid co-pending application, Serial No. 684,677, filed August 11, 1933, now issued as Patent 2,215,-257. Anti-friction bearings are used in a similar manner as explained in connection with the drive pinion 242 and the gear 244. A suitable machined face 250 is provided to allow the manifold 40 to be secured in proper manner. As best shown in Fig. 22, the ends of the fluid channels in the manifold are provided with sealing devices 502, later to be more specifically described in reference to Fig. 39 and the valve structure 346 which incorporates similar sealing mechanisms. A unitary housing 252 supports all of the above elements in such a manner that the pump 226 is removable without disturbing the variable stroke adjustment 248, and the variable stroke 248 is similarly removable without disturbing the pump 226. In a similar manner the pump 224 is removable without disturbing the driving arrangement 244, and said driving arrangement 244 is removable likewise without disturbing the pump 224. The above arrangements have proved extremely valuable because it not only enables immediate location of any trouble, but it also enables the trouble to be quickly remedied. That is to say, it is merely a matter of removing a single unitary part without disturbing associated unitary parts. A filling arrangement 254 is incorporated for adding hydraulic fluid to the system and another filling arrangement 256, Fig. 25, is incorporated for maintaining proper lubricant in gear chamber 258.

Figure 27 discloses two safety valves or devices, 260 for the pump 224, and 262 for the pump 226. A flange member 264, Fig. 26, serves the purpose of allowing the unit as a whole to be properly secured to the column 4 with suitable screws (not shown). A device 266, precluding aeration of the propelling fluid, is also incorporated within the unit and has a receiving member 268 for receiving fluid returned to the pump unit from the valve 228. An adjustable pressure control member 270 serves the purpose of maintaining a predetermined load against the fluid returned from said valve 228. Said adjustable pressure control member 270 has an external adjusting mechanism 272. The details of the device are clearly explained in my Patent No. 1,985,748.

Referring now to diagram Figure 20, it will be seen that fluid from the pump 224 is dispatched to the valve 228 through channel 274 and is received from said valve 228 through channel 276. Fluid is also dispatched from the pump 226 through channel 278 and is returned through channel 280. A channel 282 connects the valve with the actuator 26 and serves as means for dispatching propelling fluid in the forward direction for shifting the carriage 12. Another channel 284 serves as means to dispatch propelling fluid between the valve 228 and the actuator 26 for actuating the carriage 12 in a reverse direction. Hence, when the carriage is actuated in a forward direction fluid is received from the actuator through the channel 284, and likewise, when the actuator causes a reversal of the carriage 12 fluid is received from the actuator through the channel 282. Two other channels 286 and 288 connect the valve 228 with indexing actuators 86 in such a manner that propelling fluid in the channel 286 will move the piston 238 in a downward direction and propelling fluid in the channel 288 will move the piston 238 in an upward direction. Likewise, when propelling fluid is dispatched through the channel 286, fluid is received from the actuator through the channel 288, and likewise, when propelling fluid is dispatched through the channel 288, fluid is received from the actuator through the channel 286.

The valve arrangement 228 is used as a determinative whereby the complete actuation and speed of both of the actuators 26 and 86 is effected, thereby providing a unitary structure. Referring to Figures 21, 22 and 23, it will be seen that a main piston member 290 serves as a primary control member and another piston member 292 serves as a secondary control member and is actuated in response to said primary control member 290. Said control member 290 is shiftable to a plurality of positions. In the neutral position, fluid is received through the channel 274 and is allowed to pass through member 290 through channels 294 and 296 to chamber 298 and is returned through the channel 276 to the receiving member 268 in a manner as previously explained. Another chamber 300 is connected with said chamber 298 through channel 302, indicated by dot-and-dash lines in Fig. 21, for the purpose of maintaining the main piston member 290 in hydraulic balance. When the main piston 290 is shifted to the right to a position of rapid traverse, channels 294 and 296 are blocked, and fluid from the pump 224 is dispatched to the actuator 26 through proper channels in the valve 228, through the channel 282, and fluid is received from the actuator through the channel 284 and proper channels in the valve. When the main piston member 290 is shifted to a position of feed, fluid from the pump 224 is allowed to circulate in a similar manner as when said main piston member 290 occupies a neutral position and explained above, but the piston member 292 occupies a position as shown in Figure 21, allowing fluid to be dispatched to the actuator from the pump 226 through the channel 278 for the purpose of propelling the actuator 26 at a feeding rate. If the main piston member 290 occupies a position of "spindle stop," channel 304 is blocked from chamber 306. Channels 308, 310 and 312 will then allow fluid to be dispatched to chamber 314 resulting in fluid flow to the actuators 86 through the channel 286, and fluid is returned from the actuators through the channels 288 and 304 to the chamber 300. When the piston 290 is placed in position of "Feed Stop" channel 316 is open to the chamber 300, hence allowing the piston member 292 to shift to the right position, and thereby stopping the feeding by blocking the channel 288 through port 318 and channel 320, thus cutting off fluid flow to the actuator 26. It is therefore apparent that fluid from the pump 226 merely circulates through the channel 278, the channel 282, channel 324, port 322 and the channel 280 back to the pump 226. When the main piston member 290 occupies the position of "Rapid Return," fluid is dispatched to the actuator 26 in a direction reverse to that given in the previous explanation relating to the "Rapid Approach" position. Figures 22 and 23 show a mechanical control arrangement consisting of cams 326 and 328, and a suitable number of control dogs 330, for controlling the shifting of the valve.

*Work table—Shifting, loading and automatic clamping*

I shall now describe in detail structure which causes shifting of the work table, loading of the work parts, automatic clamping and the like, and I have disclosed the elements involved diagrammatically in Figure 29. For the purpose of enabling those skilled in the art to quickly grasp the function, I shall describe the above particularly in conjunction with said diagram, and shall only refer to enlarged detailed illustrations when it facilitates a better understanding. A large volume pump 332 which is similar to the pump 224 previously described is connected to a fixture valve 334 through suitable channel 336. Said valve 334 is illustrated more in detail in Figures 30, 31 and 32. A fixture fluid motor 338, see also Fig. 18, is shown drivingly connected to the gear 194 through the cylindrical rack member 196. A fluid channel 340 is connected to one end of said motor 338 and another fluid channel 342 is connected to the opposite end of said motor 338. It will then be apparent that propelling fluid in the channel 340 will shift a piston 344 to the left and the channel 342 serves as a receiving channel for receiving the return fluid from the actuator, whereas, when fluid in the channel 342 serves as propelling medium the piston 344 will be shifted to the right and the channel 340 serves as receiving channel.

A clamping and loading valve 346 is shown connected to a plurality of fluid motors 368 and 370, and is also connected to said fixture valve 334 by channel 348. Channel 350 connects said valve 346 to said actuator 210, previously described, in a manner as to impart movement to a piston 352 to the left when propelling medium passes through said channel 350. A companion channel 354 serves as conveying means for propelling fluid which actuates said piston 352 in the opposite direction, hence the aforesaid channel 350 and channel 354 alternately serve to direct fluid to said actuator 210 and to receive fluid from said actuator 210. For positively controlling the travel of the piston 352, an adjustable stop screw 356 is located at the left with respect to said actuator 210, and another positive stop screw 358 is located at the opposite end. Suitable structure is incorporated to preclude any leakage in the vicinity of said stop screws. It is desirable to control the speed of travel of said piston 352 and for that purpose I employ an adjustable orifice 360 having an adjusting member 362 and a cap member 364 for the purpose of precluding leakage. The distance of the travel is governed by adjusting the stop screw 356 in conjunction with port arrangement 366.

Clamping actuators 368 and 370 serve the purpose of clamping the work pieces 160 and 160A as clearly disclosed in Figure 12. Channel 372 connects the loading valve 346 with both of said clamping actuators 368 and 370 at the lower end, and a companion channel 374 connects in a similar manner to the upper end. Hence, when propelling fluid is dispatched through the channel 372, pistons 376 and 378 move in an upward direction. Likewise, when propelling fluid is dispatched through channel 374, said pistons move in a reverse or downward direction. The channels 372 and 374 therefore serve alternately for dispatching propelled fluid and receiving fluid. Another actuator 380 is incorporated for the purpose of actuating the locating dowels 180, previously mentioned, preferably in one direction only, namely, to retract said dowels. A clamping or dowel control valve 382 receives fluid from the channel 374 through branch channel 384, and has one channel 386 connected to the actuator 380 for propelling purposes, and has another channel 388 connected to the drain. A relatively small pump 390 is connected to the valve 346 to a port 392 for the purpose which will be presently described. Hydraulically operated electrical contactors 622 and 622A, Fig. 12, are incorporated for the purpose of automatically starting a machining cycle, and the structure will be described under the heading "Electrical structure." It is sufficient at this point to say that Figure 12 discloses a fluid channel 394 arranged within the clamping actuators 368 and 370 so as to only allow fluid pressure through suitable structure to act upon and operate said contactors 622 and 622A, when the pistons 376 and 378 occupy a clamped position as clearly shown in the aforesaid Figure 12, the purpose of this arrangement being to preclude the starting of a cycle when the work piece is not in the proper clamped position. Hence, if any of the locating dowels 180 should not be properly engaged with the work parts 160 and 160A, no action will be imparted through the channels 394.

Again referring to Figure 12 for the purpose of more clearly explaining the clamping action, it can be seen that a piston rod 396, one in each cylinder, is connected with the shiftable clamping member 400 through the medium of a suitable T-slot 402, said T-slot serving to facilitate the attachability of said clamping actuators 368 and 370. Pivotally mounted arms 398 and 404, mounted on brackets 412 and 410, operatively connect the clamping member 400 for clamping purposes through a pivoted member 406. Said member 406 has a suitable pivot stud 408 for the purpose of presenting a compensating action to said pivotally attached arms 398 and 404 so as to permit actuation of sliding members 414 and 416. A suitable housing 417 supports the aforementioned parts. Said sliding member 414 imparts a reciprocating movement to clamping stud 418, and, likewise, the sliding member 416 imparts a similar movement to a second similar clamping stud. A clamping block 420 is secured to the clamping stud 418. A plurality of clamping pads 422, Fig. 13, are secured to the clamp block 420 and are engageable directly with the work part 160. Said clamping pads 422 are preferably made of material similar to asbestos brake lining, whereby to prevent any mutilation of the work piece 160 during the clamping action. A plurality of alignment members 424 and 426 are secured to said clamp block 420. Another clamping block 428 connected to the second clamping stud is identical in function and structure to the clamp block 420, and therefore an explanation of the clamp block 420 is sufficient for both. Before leaving this subject matter, attention is directed to the fact that clamping action is imparted when the piston 376 moves in a downward direction. The clamping action of the blocks is equalized through the pivotally attached arms 398 and 404 and the rollers 430 and 432. I wish to point out that slot 434 in sliding the member 414 serves to maintain a positive action between said sliding members 414 and the clamping stud 418, and an inclined surface 436 cooperates with a similarly inclined surface arranged on the member 418 for the purpose of carrying the load during the final clamping. It will thus be apparent that the structure just described is of the self-locking nature. What I aim to say is that the frictional resistance in all of the aforesaid clamping members maintains a clamping action in a manner so as to preclude any slight variation in the clamping fluid causing any shifting of the work part 160 during the machining operation. The work part 160A has a similar clamping arrangement as described pertaining to the work piece 160, consequently no further explanation is necessary for a clear understanding.

To enable those skilled in the art to understand the specific structure and function of the valves disclosed, I shall now briefly describe said structures. Figures 34, 35 and 36 clearly illustrate the dowel valve 382. A valve housing 438 is secured in a suitable manner to a platform support 440, as seen in Figure 18. A suitable piston member 442 is slidably mounted within said valve housing 438. A fluid receiving port 444 receives fluid from the branch channel 384 and in a position as shown serves as blocking means to prevent any flow of fluid through the valve 382. The position may be designated "clamping position." Another port 446 is connected through the channel 386 to the actuator 380. Therefore, fluid from said ports 444 and 446 is allowed to flow when piston 442 is shifted upwardly to the position "unclamping position." It will be further seen that a piston 448 of the actuator 380 may be shifted a sufficient distance until branch channel 450 connects the channel 386 to the drain.

Figure 35 discloses the means for actuating the piston 442 consisting of a shaft 452 suitably mounted within said valve housing 438, and a link member 454 which is suitably connected to a control arrangement 456 associated with rack 212 and shown in Figure 19. The shaft 452 carries another control arrangement at the opposite end of the shaft 452 including a supporting member 460, and a latch member 462 pivotally secured to said supporting member 460 through screw stud 464 and resiliently maintained in one position by spring 466. Said spring is secured to the latch member 462 and the supporting member 460, and serves as means to allow a dog member 468 shown in Figure 19 to pass over when moved in one direction, and to engage for the purpose of actuation when moved in the opposite direction. Any suitable structure may be incorporated, and the above arrangement is merely shown for the purpose of illustrating the actuation of the valve 382 by the rack member 212 in one direction and by dog member 468 in the opposite direction.

The clamping and loading valve 346, illustrated more clearly in Figures 37, 38, and 39, is preferably adapted for both automatic and manual actuation. A valve body 470 serves as a housing for a sliding piston valve 472. End housing 474 is suitably secured to the body and presents a housing for a valve stem 476. Said valve stem is yieldably held in one position by a spring 478 and is actuated in the opposite position by fluid power dispatched through channels 480 and 482 from the circular port 392. Before leaving the subject, I wish to point out that actuation by said fluid power requires a predetermined pressure and the function is more clearly explained under the heading "Operation."

As explained previously with reference to Figure 29, the valve body 470 has a plurality of circular ports connected to the various fluid motors.

Ports 484 and 486 connect to the fluid motor 210; port 488 connects to the valve 334; and ports 392 and 490 connect to the fluid motors 368 and 370. Fluid channel 492 connects fluid chambers 494 and 496; port 498 connects in a suitable manner to a self-contained fluid power generating structure designated generally by the numeral 220, Fig. 18. To enable a clear understanding of the structural arrangement pertaining to the self-contained structure 220, it is sufficient to state that it is powered by an electric motor 222A and it is similar to the self-contained hydraulic fluid power generating structure or unit 38 explained and disclosed in Figures 24, 25 and 26, except that the pump 226 is not present. The large volume pump 332 and the pump 390, as shown in Figure 29, are drivingly coupled together and located in a manner similar to the pump 224 shown in Figure 24. The structural characteristics of said large volume pump 332 and the pump 390 are the same as explained in connection with the pump 224.

Figure 39 shows a very practical fluid coupling 502 consisting of an outer cone 504, a mating inner cone 506, packing or washer members 508, and preload cylindrical member 510. When it was desired to connect a fluid channel, such as 482, with a matching channel in another member, such as channel 480, it has heretofore presented serious difficulties because of the problem of sealing against fluid leakage. By machining the members to be connected, as shown, and utilizing conventional means for holding said members together, it is found that any number of channels may be connected so as to present a fully leakproof joint. I wish to add that the conical surfaces, when forced together, first cause the spaces in said valve body 470 and end housing 474 to fill completely. Then a compression is imparted to preload member 510, which places the unit as a whole under a predetermined preload. This preload member 510 is preferably made of spring steel for the purpose of maintaining said preload indefinitely. The function of the loading valve 346 will be further described under the heading "Operation."

The fixture valve 334, referring particularly to Figures 30, 31, 32 and 40, is a structure which is similar in functional characteristics to structure shown in my Patent No. 1,924,422. It is capable of dispatching fluid at a relatively large delivery for imparting propulsion at a maximum rate of speed in both directions to the piston 344 of actuator 338, Fig. 29, to operate the work carriage shifting rack 196, Fig. 14. Further, it has a plurality of neutral positions allowing "by-passing" of the propelling fluid; and, still further, in said by-passing positions it allows said propelling fluid to be controlled by a plurality of other valves, as clearly illustrated in Figure 29. Housing 512 shiftably supports a piston valve member 514, and said piston valve member 514 is actuated by means of a control arm 516. Said control arm is supported by a control shaft 518, and control cams 520 and 522, and 524 serve as means to shift said member 514. Said shifting is also accomplished by solenoids which are presently to be described. A valve stem 526 is placed within said member 514 in a manner as to block passage 528 in selected positions of said piston valve member 514. As illustrated in Figure 30, fluid through the passage 528 is allowed to pass through at substantially no restriction, and is further passed through passages 530, 532, 534, and 536 to chamber 538. For maintaining the piston valve member 514 in proper balance, another chamber 540 is located at the end opposite from said chamber 538, and is connected thereto by channel 542.

Referring also to Figures 14, 17 and 29, the rack operated pinion arrangement 194 is rotatable in forward and reverse directions, as explained previously, hence propelling fluid through the fluid channel 340 causes a clockwise rotation, as viewed in Figure 29, and propelling fluid through the fluid channel 342 causes the reverse or anti-clockwise rotation of said pinion arrangement 194. Assume that the crank pin 172 is to be rotated to a position indicated as "Stop A." By shifting the piston valve member 514, Fig. 30, to the right to a position which permits groove 544 to register with port 546, fluid at maximum delivery flows through said groove 544 and port 546, and the fluid in channel 342 shifts piston 344 to the right at a maximum speed. A control arrangement about to be described slightly shifts piston valve member 514 during the very last portion of the stroke of said piston 344 so as to block the port 546, thereby eliminating any shock and further allows the propelling fluid to by-pass through the passage 528. Shifting piston valve member 514 again a sufficient distance to allow slot 548 to register with restricted passage 550, fluid is allowed to pass through said restricted passages 550 and 552, port 554 and further thru the fluid channel 340 causing a shifting of the piston 344 to the left to a position indicated as "Remove Tool A." The piston valve member 514 is shifted slightly during the final arrival at said "Remove Tool A," whereby to block said restricted passage 550 and establish a circulation of fluid through the passage 528. Again shifting the piston valve member 514 to the left sufficiently to allow groove 556 to fully match with port 554, fluid is dispatched at a maximum delivery through the fluid channel 340, thereby rotating pinion arrangement 194 in the clockwise direction until it reaches the position indicated as "Stop B." During the last portion of said rotation, the piston valve member 514 is shifted to the right slightly to block the groove 554 for the purpose and in a manner similar to that explained previously in connection with the position "Stop A."

Again shifting the piston valve member 514 to the right sufficiently to allow the slot 548 to register with restricted passage 558 fluid is dispatched through channel 559, and further, through the port 546 and the channel 342, and the pinion arrangement 194 is rotated in anticlockwise direction sufficiently to reach the position as indicated "Remove Tool B." At this point the piston valve member 514 is shifted in a manner similar to that previously explained in connection with the "Remove Tool A" position, and finally the piston valve member 514 is shifted to its extreme position to the right. The pinion arrangement 194 is rotated in an anti-clockwise direction at a maximum speed until the starting point explained above as "Stop A" is reached.

It should be understood that passages for returning fluid, such as 560 and 562, are incorporated, and I have not deemed it necessary to show the valve structure in various positions as the above explanation should be sufficiently clear. Attention is directed to the fact that the structure disclosed herein has been in operation and is performing satisfactorily according to statements made in relation to the above mentioned article in the July 27, 1935, issue of "Automotive Industries."

Referring to Figure 33, it will be seen that I have found it desirable to use a safety cam 564 fixed to shaft 518 in conjunction with a swingable detent 566 and adjustable resilient means 568, arranged in a manner as to properly hold the piston valve member 514 in an impositively locked position when said piston valve member 514 occupies positions corresponding to the above mentioned "Remove Tool A" and "Remove Tool B" positions. Notches 570 and 572 match with point of detent 574 in any suitable manner.

I shall now describe the control arrangement for the last described valve structure 334. I wish to call attention to control arrangement described in my copending application Serial No. 582,192 filed December 21, 1931. This application has now issued as Patent 2,078,697, dated April 27, 1937. Referring to Figures 18, 41, and 42, control drum 576 is rotatably mounted on anti-friction bearings 578 and 580. Suitable shaft 582, spline coupling 584, washer 586, screw 588 and hub 590 serve as an attachable mounting for said control drum 576. A suitable number of screws 592 maintain said control drum 576 in proper position on said hub 590. A circular rack 594 engages a gear 596, the gear being integral with said shaft 582. Said rack 594 is coupled to piston rod 598 through suitable coupling 600, the piston rod being connected to piston 344 of actuator 338, Figs. 18 and 29. Shifting of said piston 344 in one direction or the other causes rotation to be experienced by said control drum 576 in both clockwise and anti-clockwise directions. I shall now explain the control drum 576 in conjunction with the above valve 334, starting with the "Stop A" position. It will be seen by reference to Figure 43 that the cam 520 is abutted by control member 602 carried by drum 576 until piston valve member 514 is shifted to a position as previously explained. Referring to Figure 44, it will be seen that control cam 522 abuts the aforesaid control member 602. An electrical actuator, later to be described, is used for shifting the valve member 514. Hence, the structure as described serves as means to properly establish the proper registration of ports within the valve 334. Figure 45 discloses what takes place when the position "Remove Tool A" is reached. The control cam 524 abuts control member 604 in a manner as to shift the piston valve member 514 to a neutral position. The aforementioned magnetic actuator, later to be described, is again energized to cause the piston valve member 514 to shift, and the position occupied by the control cam 524 during such shifting is clearly shown in Figure 46. Figure 47 shows the valve being neutralized when position indicated as "Stop B" is reached. Figure 48 is similar to Figure 44 when position "Remove Tool B" is reached and control drum 576 is rotated in the reverse direction. Likewise, Figure 49 conforms to Figure 45, except said control drum 576 is rotated in the reverse direction. Finally, Figure 50 corresponds with the position of the control elements as shown in Figure 46, except that the aforesaid control drum 576 rotates in its reverse direction. When the starting position "Stop A" is reached, the control elements occupy the position shown in Figure 43, and the valve 334 again occupies its neutral position.

Referring again to Figure 41, it will be seen that a control member 606 companion to member 604 is used when control drum 576 is rotated in the opposite direction. Likewise, control member 608 is similarly companion to said control member 602 during the opposite rotation of control drum 576. A control member 610 is located on the periphery of said control drum 576, and serves as shifting means for the electrical control means 612. A companion control member 614 on said drum 576 is shown which serves a purpose similar to control member 610 when control drum 576 is rotated in the opposite direction. Detailed explanation pertaining to said electrical control means will be made under heading "Electrical structure." I have not deemed it necessary to describe in detail securing means such as screws 616 for securing the different control members in their proper positions, and it will be understood that any suitable arrangement may be used, and I do not limit myself to the specific structure as disclosed.

*Electrical structure*

I shall now describe in detail the above structure as utilized in my invention. Previously I have pointed out the unitary arrangement of the mechanical and hydraulic structures, and a unitary arrangement is also employed in the design of the electrical structure. The elements involved have been described in a manner to enable those skilled in the art to understand clearly the combination of these elements. Other suitable structure may be used as long as it serves in substantially the same manner for substantially the same purpose. Attention at this point is directed to the fact that the electrical structure must not only insure the performance of the proper function of the machine, but also must be so constructed as to insure against premature or inadvertent performance, as well as the accumulation of grit and dirt. The electrical structure must also present a fully protected, safe arrangement not only for the operator but also for various workers who maintain the structure in proper operation.

I shall first describe the prime movers or electric motors which rotate the spindles 54. There are shown, Fig. 51, eight such motors in groups of four, but explanation of one will suffice for a clear understanding of all. The motor 62, in Figure 4, may be of any suitable design but must be able to withstand frequent reversal and stop. The motor must also be fully balanced so as to preclude any vibratory action from being imparted to associated structures. Suitable reversing magnetic contactors are used, and attention is directed to auto-transformer 618 incorporated for the purpose of selecting any suitable voltage when running the motor in a reverse direction, said auto-transformer being a commercial product and well known to those skilled in the art. It is found impractical, when indexing, to reverse the motor with the same voltage employed to rotate the motor in a forward or cutting direction. Therefore the auto-transformer is incorporated having a plurality of "taps," which "taps" have various voltages and allow the selection of suitable voltage when reversing the motor. In my above mentioned application Serial No. 684,677, filed August 11, 1933, now issued as Patent 2,214,257, I fully describe the various elements pertaining to the aforesaid reversing, but I do not disclose the aforementioned auto-transformer. An electric motor or prime mover 222 is used for each of said self-contained hydraulic fluid power generating structures or units 38. A similar motor 222A is used for the aforesaid self-contained fluid power generating structure 220 for the work support fixture.

I shall now describe the most important electrical control elements and their purpose, particular reference being made to Fig. 51. Certain collateral elements and switches shown in Fig. 51, such as those indicated "Jog forward" and "IJR" et cetera are not hereinafter referred to, as their operation is not directly involved in the primary operating cycle. A suitable limit switch 620 is associated in any suitable manner with the actuator 380, Fig. 29, for the purpose of safety, and to allow other associated structures to operate only when locating dowels 180 properly engage the work parts 160 and 160A. Pressure contactors 622 and 622A, Fig. 12, serve the purpose of automatically starting the cycle when the clamping structure 221 is fully actuated and pistons 376 have opened the channels 394. An electric contact 624, Fig. 41, is located in association with the control drum 576 and is operative only when actuated by either of the control elements 610 or 614. Starting relays 626 is energized through the pressure contactors 22 and 622A only when said contact 624 is closed. Further, limit switches 628 and 628A (Figure 1) located on the left and right hand columns are closed only when the uppermost position is occupied by said tool carriages 12. Through contacts 626a and 626b of relay 626 and feed pump interlocks 646a and 648a of coils 646 and 648, solenoids 630 and 630A are energized, thereby actuating valves 228, Fig. 20, for the right and left hand spindle banks in one direction. Fluid actuators 86 shift to open electric contacts 632, Fig. 9, and 632A and to close electric contacts 634 and 634A, and also shift contacts 636 to open (there is one such contact for each motor, hence 8 contacts altogether) and finally shift contacts 638 to close (similarly there are eight contacts 638 altogether). Closing contact 634 actuates contacts 640 through magnetic actuator 642 (four sets of contacts altogether) and closing 634A closes contacts 644 through magnetic actuators 642A through "interlock" contacts 646a and 648a. Contacts 640 and 644 start spindle motors 62 (eight motors altogether). Switches 640 and 644 are contacts of suitable number for carrying the motor current. Switches 640A and 644A are interlock contacts opened by actuators 642 and 642A to prevent energizing of reversing magnetic actuators 674 and 674A while contacts 640 and 644 are closed. Actuation of limit switches 628 and 628A is accomplished by shifting said tool carriages 12. It should be understood that solenoids 630 and 630A are deenergized by said electric contacts 628 and 628A.

Limit switches 650 and 650A, Fig. 1, were closed when said carriages 12 were at the top and thus permit starting of the left and right hand motors 222. Interlock contacts 640B and 644B, one for each spindle motor actuator contact 640A and 644A respectively, close prior to movement of the left and right hand tool carriages 12. Consequently normally opened interlocks 640B and 644B by-pass limit switches 650 and 650A so that when the carriages 12 descend, opening limit switches 650 and 650A, contactor 646 for the left hand motor 222 remains closed if all four spindle contactors remain closed. If any one of these spindle contactors should open during the feed of said carriage 12, its interlock in opening will disconnect the left hand motor 222 through contactor 646b. Also, should one of the spindle contactors 640 fail to closee at the beginning of the cycle, the left hand carriage 12 will be precluded from continuing. Likewise, limit switch 650A with interlock contacts 644B functions in connection with the right hand motor 222 thorugh contactor 648b. At the end of the travel of said carriage 12, limit switches 650 and 650A reclose. Action of the fluid actuators 86 causes electric contacts 634 and 634A to open and electric contacts 632 and 632A to close. Opening electric contacts 634 and 634A disconnects magnetic actuators 642 and 642A, which open switches 640 and 644 and release contacts 640A and 644A. Releasing 640A and 644A causes the reversing magnetic actuators 674 and 674A to be energized through 646a and 648a, which closes the reversing switches 675 and 677 for the spindle motors. Further, interlock contacts 676, one for each actuator 674 and 674A, close in series with plugging switches 658 and 658A associated, respectively, with one spindle on each carriage. Said interlock contacts and plugging switches control the energization of solenoids 660 and 660A, Fig. 10, which control the movement of the indexing plungers 82 into indexing position.

In my disclosure I have shown that each contact such as 640 or 644 is companion to the spindle motor 62, and when releasing, deenergizes said motor. However, it should be understood that only one contactor may be used for each group of motors. Further, other structures which might tend to serve the same office as the structure just referred to are contemplated.

I have previously called attention to the autotransformer 618, and it is found that it is permissible to allow any of the aforesaid motors 62 to be stopped when energized in the reverse through said transformer for a certain length of time without any injury to said motor.

A cycle control solenoid 662, Fig. 18, located in association with the aforesaid self-contained fluid power generating structure 220 serves as an actuator for shifting the valve 334 in one direction a number of times, and the amount of shifting is governed by control structure shown in Figure 44. Solenoid 662 can be energized only when all the contacts 636 are closed. Each contact 636 closes when its associated boring spindle is properly indexed and the index plunger 82 completes its forward movement after the boring operation. By referring to Figure 41, it will be seen that shifting of the electrical contacts 624 takes place as soon as control drum 576 is rotated. The energizing of said solenoid 662 and the starting relay 626 may be effected by opening contacts 624. Contact 664 is allowed to close when control member 610 ceases to contact control rod 666. Relay 668 energized by contact 664 serves as means for energizing solenoids 670 and 672, Fig. 3, through its contacts 668A and 668B, resulting in the shifting of valves 228. Opening lower limit switches 678 and 680, Fig. 1, disconnects solenoids 670 and 672. When said carriages 12 reach the top, limit switches 628 and 628A are again closed, causing solenoid 662 to be energized since relay 668 remains closed. Contacts 624 close due to shifting of the drum 576 which causes closing of the relay 626.

In response to said relay 626, solenoids 630 and 630A are energized and shift the valves 228. Another cycle of operation, similar to the above, is initiated and completely performed, but, upon the completion of the second phase with respect to contacts 636 there is effected the energizing of solenoid 662A, Fig. 18, said solenoid 662A permitting propelling fluid to enter in the reverse direction pertaining to actuator 338, resulting in the disconnection of limit switch 624 and the deenergizing of relay 626 and solenoid 662A. Again closing of relay 668 as actuator 338 is operated energizes solenoids 670 and 672 causing a rapid return of said carriages 12 to their original position. When said carriages 12 arrive in the original position as stated, solenoid 662A is again energized shifting the valve 334 and thereby returning the piston 344 to its original or starting position. During the return to said starting position, fluid power has been caused to enter clamping actuators 368 and 370 in a reverse direction, consequently opening pressure contactors 622 and 622A. Further, dowel pin limit switch 620 has been opened, whereby a plurality of means are employed to preclude the accidental starting of another cycle. Limit switches 682 and 684, operable in accordance with the position of the slide member 176 through suitable linkage 686 and 688, respectively, Fig. 18, are incorporated for the purpose of selecting either the solenoid 662 or the solenoid 662A in a manner to govern the direction of the actuator 338. The sequence of operation of the foregoing mechanism will be particularly set forth hereinafter under "Operation."

To more clearly illustrate the means for operating the limit switches mounted on the oppositely disposed columns, reference is made to Figures 52 and 53. In Figure 52 I have disclosed the rear side of the column at the right of Figure 1, which carries three limit switches 628, 650, and 680. These limit switches are companion to corresponding limit switches 628a, 650a, and 678 carried by the opposite column. Associated with the limit switch 628 is an actuating mechanism which I have designated generally by the numeral 681. This mechanism 681 includes a suitable housing 683 which reciprocably supports a pin 685. The upper end of this pin carries a roller 687 adapted to be engaged by a dog, for example, the dog 689 (Figure 52) for latching the pin 685 in its downward position. When the pin 685 and roller 687 supported thereby assume their upward position, as shown in Figure 53, said pin is released from a spring-pressed locking pin 689a which is adapted to be shifted against a coil spring 691 when a finger 693 is engaged by a dog 695. It will be understood that the limit switch 628 serves as an interlock for the spindle motors and the pump motors, whereas the limit switch 650 serves as an interlock after the boring operation has been completed and the work is to be shifted, and the limit switch 680 serves as an interlock in connection with the shifting of the work piece for purposes of clearance. With the foregoing explanation it will be understood that the above mentioned limit switches and their companion limit switches on the opposite column are timingly controlled through the agency of suitable dogs movable with each carriage 12.

Referring further to Fig. 51, a starting relay coil is shown at 696 for controlling the power line contacts 696a of the fixture pump motor 222A. Suitable overload switches are indicated in the various control circuits at 697.

I have above explained how a plurality of work parts are shifted a number of times before being completely machined, but it should be fully understood that the structure described may be modified without deviating from the spirit and scope of the invention as disclosed. My invention contemplates transferring a single or plurality of work pieces from one conveyor by means of power actuated means into a machine tool structure; also the utilization of power clamping means and power positioning means after a certain prelocation; and then finally, employing power means for shifting the work parts to another receiving conveyor.

*Operation*

In order to present a proper description of the operation, it is necessary to first assume that a certain number of adjustments are made relating to structures requiring such adjustments. Therefore, I assume that all of said adjustments have been made, and that the three hydraulic fluid power generating structures—two designated by the numeral 38 and one by the numeral 220—are properly functioning, further, that the switch 700, Fig. 51, is in "automatic" position. Further, it must be assumed that the master switch 690 (Figure 51) is properly closed and that the "auto-transformer" 618 is properly connected. Further, it must be assumed that the two work parts 160 and 160A (shown in Figure 12) have been machined and are ready to be removed, and that the operator has placed two other work parts 160 and 160A on the loading platform 198, Fig. 18, properly located on loading actuator 202 in the manner previously described.

The operator manipulates the manual control lever 218 to the right and upward as seen in Fig. 19 in such a manner as to cause the clamping and loading valve 346 to be operated by means of sector 218a and arm 218b, Figs. 19 and 38, to its "Loader Approach" position to dispatch propelling fluid to the actuator 210, causing the piston 352 to travel to the left (Figure 29) resulting in shifting the work parts from the loading platform 198 into the machining position, shown in Figure 12, ready to be engaged by the locating dowels 180, simultaneously causing the previously machined work parts 160 and 160A to be transferred to a suitable unloading platform or conveyor (not shown) used for shifting the work parts away from the machine. Shifting the manual control lever 218 so as to rotate the shaft 692, Fig. 19, causes helical gearing 694 to impart rotation to another shaft 696, Figs. 12 and 19, which shaft is slidably connected to the dowel actuating shaft 698. This causes the locating dowels 180 to be brought to proper registration with the work parts 160 and 160A.

Further shifting of the control lever 218 to the left and downward as seen in Fig. 19 in a direction parallel to the axis of the shaft 692 causes the clamping and loading valve 346 to be shifted to "clamping" position, allowing propelling fluid to be dispatched through channel 374 to move the pistons 376 and 378 of the clamping actuators in a downward direction, thereby causing actuation of the clamp blocks 420 and 428. If the work parts are properly located by the dowels 180, said pistons 376 and 378 will be shifted sufficiently to uncover the channels 394. Further, if the dowel valve 382 occupies the "clamping position" of Figure 34, sufficient pressure is allowed to be built up against the pistons 376 and 378 to shift the sliding piston valve 472 of valve 346, through the medium of valve stem 476, to the position indicated in Figure 37 as "loader return" position. The pressure also simultaneously actuates the pressure contactors 622 and 622A, Fig. 12.

Attention is directed to the fact that, when locating dowels 180 were placed in the engaged position, limit switch 620 was caused to be closed. Further, that the pump 390 is used for the purpose of maintaining a uniform pressure against the aforesaid pistons 376 and 378, and that a by-passing means, similar to safety means 262, Fig. 27, is associated with the pump 390. Closing the limit switch 620 and the pressure contactors 622 and 622A causes the starting relay 626 to be energized (Figure 51) through the contact 624 now closed because piston 344 is at its extreme right end position, more clearly shown in Figure 41. The limit switches 628 and 628A (see Figure 1) are closed due to the upper position of the carriages. The relay 626 by closing its contacts 626a and 626b energizes solenoids 630 and 630A (see Figure 51), which solenoids in turn shift the valves 228 (Figures 51 and 23). Shifting of said valves causes fluid to be dispatched to the index actuators 86, thereby first withdrawing square index plungers 82, then opening the contacts 632 and 632A, closing the contacts 634 and 634A, and finally opening the contacts 636 and closing the contacts 638. Simultaneously, fluid is allowed to be dispatched through channel 282, Fig. 20, and received through channel 284, causing a forward shifting of the carriages 12 at a rapid rate until one of the control dogs 330, one for each carriage, move the valves 228 into a "feeding" position, shown in Figure 21, causing the carriages 12 to proceed at a feeding rate. Closing the electrical contacts 634 causes magnetic actuators 642 to be energized, and closing contacts 634A causes magnetic actuators 642A to be energized by means of circuits extending through the contactors 646a and 648a. The interlock contacts 615a and 677a, which are in the circuits to actuators 642 and 642A, are opened when the reversing magnetic actuators 674 and 674A, respectively, are energized, thus preventing energization of any actuator 642 or 642A if the associated actuator 674 or 674A is energized. The closing of the contacts 640 and 644 by the energizing of actuators 642 and 642A starts all of the spindle motors 62 rotating in a forward or cutting direction. Carriages 12, when leaving the upper position, open limit switches 628 and 628A, deenergizing the solenoids 630 and 630A, thereby allowing the valves 228 to be actuated by one of the dogs 330, as explained above.

Limit switches 650 and 650A, one for each carriage, were closed when the carriages 12 were at the uppermost positions, or, in other words, at the beginning of the downward travel, thus permitting the starting of the left and righthand electric "feed pump rotors" 222. These motors were initially started by conventional push button control of the magnetic actuators 646 and 648 which closed the respective associated contacts 646b and 648b. Similarly the fixture pump motor was started by push button control through actuator 696 and its operated contacts 696a. Contacts 640A close prior to the movement of the lefthand carriage 12, consequently their now closed interlocks 640B "by-pass" the limit switch 650, so that, when said carriage opens limit switch 650, the contactor 646b for the lefthand "feed pump motor" remains closed if all four spindle contactors 640A remain closed. If any one of the spindle contacts 640A should open during the feed of the aforesaid carriage 12, its interlock 640B, in opening, will disconnect the lefthand electric motor contactor 646b, which action instantly stops the carriage 12. Further, should any one of the spindle contacts 640A fail to close at the beginning of the cycle, the lefthand carriage 12 will be prevented from continuing its cycle. Likewise, limit switch 650A and interlock contacts of the spindle contacts 644A function in connection with the righthand electric "feed pump motor" 222, as explained above regarding the lefthand motor. Any difficulty resulting in stopping one of the aforesaid electric motors outlined above will not prevent completion of the cycle for the other or opposite carriage since the interlocking systems are independent for each carriage.

Shortly before the carriages 12 reach the end of travel and before the machining operation is fully completed, the valves 228 are mechanically shifted to a "spindle index" position by one of the control dogs 330, one dog being provided for each carriage. Said shifting causes propelling fluid to be dispatched through the channels 286, Fig. 20, to the indexing actuators 86 whereby to cause the opening of the contacts 634 and 634A and the closing of the contacts 632 and 632A. Opening contacts 634 deenergizes the actuators 642 causing the contacts 640 to open and remove energy supply to the associated motors 62. At the same time, interlock contacts 640A close and cause energization of magnetic actuators 674 through previously closed contacts 638 and the contacts 646a and 648a. Likewise, opening contacts 634A causes magnetic actuators 642A to be deenergized and actuators 674A to be energized. Energizing actuators 674 and 674A causes closing of contacts 675 and 677 which applies reduced voltage from auto-transformer 618 to the motors 62 in a reverse connection so as to stop the motors by "plugging." As actuators 674 and 674A are energized, interlock contacts 615a and 677a are opened, as previously described, insuring the deenergization of actuators 642 and 642A while actuators 674 and 674A are energized.

While the motors 62 are being plugged to a standstill, the actuators 86 continue their advance until stopped by cam 142 and trigger cam 150, Fig. 11. During said travel of the actuators, the spring members 110, Fig. 7, for the index plungers are being compressed. The energizing of the actuators 674 for all the lefthand spindle motors closes their normally open interlocks 676 in series with a plugging switch 658, which switch is driven by one of the motors 62 of the lefthand carriage. This switch may be, for example, of the type shown in my aforesaid copending application, Serial No. 684,677, now Patent 2,215,-257. At the instant of reversal of said motor, the plugging switch 658 closes, causing the solenoid 660 to be energized, hence disengaging the trigger cam 150 from the cam 142. The action referred to permits the square plungers 82 to be fully actuated, or moved forward into indexing position, thereby disconnecting the plugging current by opening of switches 638 respectively as each spindle is indexed. The righthand spindle motors 62 are controlled in the same manner as just described in connection with the lefthand motors.

The index plungers 82 are now fully engaged with the index cams 70 (and switches 636 closed) whereby to positively locate the cutters 60 in a definite relation with respect to the hole in the work part and ready for withdrawal through the work piece. Attention is directed to the fact that the aforesaid indexing of the cutters 60 is entirely for the purpose of allowing the withdrawal in such a manner as to preclude any scratching of the machined surfaces. Hence the shifting of the work parts, which I am about to take up, is merely for the purpose of establishing a slight clearance between the aforesaid cutters and the machined surfaces.

I also wish to call attention to the fact that all eight spindles must be indexed as the contacts 636 must be closed in series before any other shifting can take place. At this time the starting relay 626 is still picked up and its contacts 626c are closed. Also, limit switch 682 is closed and the limit switches 678 and 680 have just been closed due to the carriages 12 reaching the ends of their feeding strokes. This causes the solenoid 662 to be energized, which causes the fixture valve 334 to be actuated, hence permitting fluid to enter the fixture fluid motor 338 at a low rate of displacement, causing a shifting of the piston 344. Through mechanism, such as the rack and pinion arrangement 194 and 196, crank member 162, slide member 176, and associated structures previously described, the work support 154 is shifted, shifting the crank pin 172 from the position indicated as "Stop A" to position indicated as "Remove tool A" (clearly shown in Figure 17). During the aforesaid shifting of piston 344, the solenoid 662 is caused to be deenergized by opening of the contact 624 in response to rotation of the control drum 576. It should be further understood that the shifting of the work support is automatically stopped, as previously described, and that the fixture valve 334 is mechanically returned to a neutral position through the action of the control dog 604, as clearly shown in Figure 45.

At the end of the aforesaid shifting of piston 344, engagement of the contacts 664 takes place due to the location of the control drum 576, which action energizes relay 668. As explained, the cutters are indexed and the cutters and the work parts are now in their spaced relation and conditioned for withdrawal of the cutters, and the energizing of the relay 668 closes contacts 668A and 668B and causes solenoids 670 and 672, Figs. 23 and 51, to actuate the valves 228, which permits propelling fluid to be dispatched through the channels 284, Fig. 20, returning the carriages 12 to their upper or starting position. It should be understood that the limit switches 650 and 650A remain closed during the return of the carriages, permitting the self-contained hydraulic power generating structures 38 to be operative. Returning of the carriages 12 to their original or uppermost position allows limit switches 678 and 680 to reopen, disconnecting solenoids 670 and 672. To initiate another cutting cycle, when the carriages 12 reach their starting position, limit switches 628 and 628A reclose, causing the solenoid 662 to again be energized through relay contacts 668c as contacts 664 remain closed and relay 668 energized. Attention is directed to the fact that the switch 682 controlled from slide member 176 remains closed due to the position of the slide member 176, which switch, as explained before, with switch 684 controls the coils 662 and 662A and thus the direction of the shifting of valve 334.

The reenergization of the solenoid 662 shifts the fixture valve 334, which valve permits fluid to enter the fluid motor 338, thereby causing the work holding and supporting carriage 154 to be shifted in forward direction, that is to say, the crank pin 172 shifts from the position indicated as "remove tool A" to the position indicated as "Stop B" in Figure 17. It should be further understood that the fluid is displaced to the fluid motor 338 at a maximum rate, as explained above. Attention is directed to the fact that at the beginning of the aforesaid action, the limit switch 682 deenergizes the solenoid 662. Toward the end of the shifting of the work holding and supporting carriage 154 the contact 664 opens, thereby disconnecting the relay 668. Following the last mentioned action the limit switch 684 closes, and, finally, at the extreme end of the shifting contact 624 again closes, energizing the starting relay 626. In response to the energizing of the aforesaid relay 626, the solenoids 630 and 630A are again energized through the limit switches 628 and 628A, which, as stated above, are closed due to the fact that the carriages 12 occupy their upper positions. The solenoids 630 and 630A cause the valves 228 to again be actuated, initiating another forward travel of the carriages 12 resulting in another machining cycle being carried through in exactly the same manner as explained above pertaining to the first machining cycle.

Upon the completion of the second machining cycle, the spindles are indexed, the contacts 636 again close, energizing the solenoid 662A through the limit switch 684 and the limit switches 678 and 680, which were caused to close at the end of the feeding travel of the carriages 12. The solenoid 662A causes the fixture valve 334 to be shifted in a manner to direct propelling fluid in a reverse direction to the fixture motor 338, causing the piston 344 to shift to the right (Figure 29) at a slow rate of travel. The crank pin 172 travels from the position indicated as "Stop B" to the position indicated as "Remove tool B," thereby slightly shifting the work holding and supporting carriage 154 so as to establish clearance between the cutters and the surfaces just machined, thus conditioning the cutters for withdrawal. During said shifting of carriage 154, the contact 624 is again opened, deenergizing the solenoid 662A. At the end of the aforesaid shifting, the fixture valve 334 is again mechanically shifted to neutral position, and just as said valve reaches its neutral position, the contact 664 closes, energizing the relay 668. The closing of the relay 668 energizes the solenoids 670 and 672 for the rapid return of the carriages to their uppermost or starting position. The limit switches 678 and 680 are permitted to open when the carriages 12 leave the lower position, and consequently deenergize the solenoids 670 and 672. Limit switches 628 and 628A are again allowed to close when the carriages reach the top or starting position, thereby causing the solenoid 662A to be again energized through the limit switch 684, contacts 636, and the relay 668. The energizing of the solenoid 662A causes the fixture valve 334 to shift, permitting propelling fluid to enter into the return side of the fixture fluid motor 338 so as to shift said motor at a rapid rate, thereby causing the work holding and supporting carriage 154 to return to its original position referred to in conjunction with Figure 17 as "Stop A." I direct attention to the fact that at the beginning of the aforesaid shifting, the limit switch 684 is allowed to open, thus deenergizing the solenoid 662A. Further, toward the end of the aforesaid shifting, the contact 664 opens, deenergizing the relay 668. Also, the limit switch 682 closes, and, finally, at the extreme end of the return of said work holding and supporting carriage 154, the contact 624 is closed.

During the aforesaid shifting to the position, "Stop A," the clamping and loading valve 346 has been actuated through rotation of the shaft 692 to its "unclamping position," permitting propelling fluid to be dispatched through the channel 372, Fig. 29, and thereby cause a release of the clamp blocks 420 and 428 from the work parts 160 and 160A. The rotation of the shaft 692 just mentioned is caused by the actuation of the dowel valve 382, which actuation is imparted by the control dog 468, Figs. 19 and 36. The dowel valve 382 is now in the "unclamped" or "dowel-out position" opposite that shown in Figure 34, which causes propelling fluid to be dispatched through the channel 386, shifting the piston 448 of actuator 380 to the felt (Figure 29) until the branch channel 450 is uncovered. This uncovering connects the dowel cylinder to the drain, and releases the pressure of fluid acting upon the pressure contactors 622 and 622A, resulting in the opening of the contacts in said pressure contactors. The withdrawal of the dowels 180 causes the limit switch 620 to also open. The two work parts have now been completely machined, and the apparatus is in condition for a new cycle to be initiated by control handle 218 and for the removal of the work parts just machined and also for the advancement of two new work parts into the work holding and supporting carriage 154, as described.

From the foregoing description of the operation it will be apparent that my invention contemplates an improved material working apparatus or boring machine which is capable of accurately performing a series of cutting operations in a very expeditious manner. While I have described my invention with reference to a particular embodiment used for boring cylinder blocks and the like, it will be apparent that said invention is by no means limited to such applications, but is capable for use in various types of machine tools for performing various types of cutting operations. Furthermore, the invention is not limited to the specific structure shown in the drawings, but is capable of numerous other modifications and changes without departing from the spirit and scope of the appended claims.

Having thus described my invention, what I claim as new and desire to secure by Letters Patent is:

1. Metal working apparatus including a main supporting base, a plurality of spindle supporting carriages, supporting structures for said carriages mounted on said base, cutter carrying spindles mounted on said carriages, driving means for said spindles mounted on said carriages, a work carrier including a supporting base mounted on said main base, a hydraulic actuator for shifting said work carrier, hydraulic actuators for said spindle supporting carriages, a hydraulic fluid power generating unit mounted in association with each of said spindle carriages, another fluid power generating unit for said work carrier mounted in association with the supporting base of said work carrier, a common control valve means for initiating the actuation of said work carrier and said spindle supporting carriages, and control means interconnecting the valve means said carriages and the work carrier, the work carrier controlling the movement of the carriages and the carriages controlling the movement of the work carrier.

2. Metal working apparatus including a main supporting base, a plurality of inclined spindle supporting carriages, inclined supporting structures for said carriages mounted on said base, cutter carrying spindles mounted on said carriages, driving means for said spindles mounted on said carriages, a work carrier including a supporting base mounted on said main base, a hydraulic actuator for shifting said work carrier, hydraulic actuators for said spindle supporting carriages, a hydraulic fluid power generating unit mounted in association with each of said spindle carriages, another fluid power generating unit for said work carrier mounted in association with the supporting base of said work carrier, valve means for intiating the actuation of said work carrier and said spindle supporting carriages, and control means interconnecting the valve means said carriages and the work carrier, the work carrier controlling the movement of the carriages and the carriages controlling the movement of the work carrier.

3. Metal working apparatus including a main supporting base, a plurality of spindle supporting carriages, supporting structures for said carriages mounted on said base, cutter carrying spindles mounted on said carriages, driving means for said spindles mounted on said carriages, a work carrier including a supporting base mounted on said main base, a hydraulic actuator for shifting said work carrier, hydraulic actuators for said spindle supporting carriages, fluid operated clamping means for securing a work part in position upon said work carrier, a hydraulic fluid power generating unit mounted in association with each of said spindle carriages, another fluid power generating unit for said work carrier mounted in association with the supporting base of said work carrier, a common control valve means for initiating the actuation of said work carrier, said spindle supporting carriages, and said clamping means, and control means interconnecting the valve means said carriages and the work carrier, the work carrier controlling the movement of the carriages and the carriages controlling the movement of the work carrier.

4. Metal working apparatus including a main supporting base, a plurality of spindle supporting carriages, supporting structures for said carriages mounted on said base, cutter carrying spindles mounted on said carriages, driving means for said spindles mounted on said carriages, a work carrier including a supporting base mounted on said main base, a hydraulic actuator for shifting said work carrier, hydraulic actuators for said spindle supporting carriages, a hydraulic fluid power generating unit mounted in association with each of said spindle carriages, another fluid power generating unit for said work carrier mounted in association with the supporting base of said work carrier, control means including valve means and electrically responsive means for initiating the actuation of said work carrier and said spindle supporting carriages, and control means interconnecting said carriages and the work carrier, the work carrier controlling the movement of the carriages and the carriages controlling the movement of the work carrier.

5. Metal working apparatus including a main supporting base, a plurality of spindle supporting carriages, supporting structures for said carriages mounted on said base, cutter carrying spindles mounted on said carriages, driving means for said spindles mounted on said carriages, a work carrier including a supporting base mounted on said main base, a hydraulic actuator for shifting said work carrier, hydraulic actuators for said spindle supporting carriages, a self-contained hydraulic fluid power generating unit mounted in association with each of said spindle carriages, another self-contained fluid power generating unit for said work carrier mounted in association with the supporting base of said work carrier, a common control valve means for initiating the actuation of said work carrier and said spindle supporting carriages, and control means interconnecting the valve means said carriages and the work carrier, the work carrier controlling the movement of the carriages and the carriages controlling the movement of the work carrier.

6. A metal working apparatus including a shiftable work supporting carrier, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, and electrically responsive means associated with said hydraulic clamping actuator and operable in accordance with a predetermined position of said clamping members and in accordance with a predetermined pressure within said clamping actuator for rendering said control means functionally operable.

7. A metal working apparatus including a shiftable work supporting carrier, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, electrically responsive means associated with said hydraulic clamping actuator and operable in accordance with a predetermined position of said clamping members and in accordance with a predetermined pressure within said clamping actuator for rendering said control means functionally operable, and shiftable control means for governing the degree of shifting of said work supporting carrier.

8. A metal working apparatus including a shiftable work supporting carrier, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, electrically responsive means associated with said hydraulic clamping actuator and operable in accordance with a predetermined position of said clamping members and in accordance with a predetermined pressure within said clamping actuator for rendering said control means functionally operable, and control means including a rotary member having control elements thereon for governing the degree of movement of the work supporting carrier.

9. A metal working apparatus including a shiftable work supporting carrier, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, said work supporting carrier being shiftable into a clamping position, and electrically responsive means associated with said hydraulic clamping actuator and operable in accordance with a predetermined position of said clamping members and in accordance with a predetermined pressure within said clamping actuator for rendering said control means functionally operable.

10. A metal working apparatus including a shiftable work supporting carrier adapted to support a work part, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, said work supporting carrier being shiftable into a clamping position, shiftable locating dowels for said work part whereby to accurately position said work part for clamping and machining, and electrically responsive means associated with said hydraulic clamping actuator and operable in accordance with a predetermined position of said clamping members and in accordance with a predetermined pressure within said clamping actuator for rendering said control means functionally operable.

11. A metal working apparatus including a shiftable work supporting carrier, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, an actuator element for shifting the work carrier, said carrier actuator element being adapted to move along a path which is longer than the actual degree of movement experienced by the work carrier whereby to enhance the accurate shifting and positioning of said work carrier, and electrically responsive means associated with said hydraulic clamping actuator and operable in accordance with a predetermined position of said clamping members and in accordance with a predetermined pressure within said clamping actuator for rendering said control means functionally operable.

12. A metal working apparatus including a shiftable work supporting carrier, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, a crank mechanism driven by said first named hydraulic actuator for imparting movement to said work carrier, and electrically responsive means associated with said hydraulic clamping actuator and operable in accordance with a predetermined position of said clamping members and in accordance with a predetermined pressure within said clamping actuator for rendering said control means functionally operable.

13. A metal working apparatus including a shiftable work supporting carrier, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, electrically responsive means associated with said hydraulic clamping actuator and operable in accordance with a predetermined position of said clamping members and in accordance with a predetermined pressure within said clamping actuator for rendering said control means functionally operable, and additional electrical control means for governing the direction of movement of said work carrier.

14. A metal working apparatus including a shiftable work supporting carrier, an actuator for shifting said carrier, a shiftable spindle supporting carriage operatively associated with said work carrier, a cutter carrying spindle on said carriage, means for driving said spindle, means for imparting movement to said spindle supporting carriage, clamping mechanism for positively securing a work part in position upon said work carrier, a control determinative for governing the starting, direction, and speed of actuation of said spindle carriage and the starting and speed of rotation of the spindle carried thereby, magnetic actuators for governing the functioning of said control determinative, a second control determinative for governing the starting, direction and speed of actuation of the work carrier, and the functioning of said clamping mechanism, magnetic actuators for controlling the functioning of said second control determinative, and electrical contactors responsive to fluid pressure in the clamping mechanism for governing the energizing of a selected number of said magnetic actuators.

15. A metal working apparatus including a spindle supporting carriage, a cutter carrying spindle mounted on said carriage, an electric motor coupled with said spindle, means for supplying multi-voltage current, means coupling said electric motor with said current supplying means, control means including magnetic contactors for automatically selecting a proper voltage for said motor and for controlling the direction, starting and stopping of said motor, automatically shiftable means for initiating the shifting of said magnetic contactors, indexing mechanism for indexing said spindle, and means controlled by the mode of movement of the spindle in connection with the indexing thereof for controlling the indexing mechanism.

16. A metal working apparatus including a spindle supporting carriage, a cutter carrying spindle mounted on said carriage, an electric motor coupled with said spindle, means for supplying multi-voltage current, means coupling said electric motor with said current supplying means, control means including magnetic contactors for automatically selecting a proper voltage for said motor and for controlling the direction, starting and stopping of said motor, automatically shiftable means for initiating the shifting of said magnetic contactors, indexing means for positively securing said cutter carrying spindle against rotation during a predetermined interval of time, and means controlled by a change in the direction of rotation of the spindle in connection with the indexing thereof for controlling the indexing means.

17. A metal working apparatus including a spindle supporting carriage, a cutter carrying spindle mounted on said carriage, an electric motor coupled with said spindle, means for supplying multi-voltage current, means coupling said electric motor with said current supplying means, control means including magnetic contactors for automatically selecting a proper voltage for said motor and for controlling the direction, starting and stopping of said motor, automatically shiftable means for initiating the shifting of said magnetic contactors, indexing mechanism for positively securing said cutter carrying spindle against rotation during a predetermined interval of time, said indexing mechanism including a shiftable plunger, and interlocking means including a magnetic actuator controlled by the mode of movement of the spindle in connection with the indexing thereof for releasing said plunger at a predetermined time during the cycle of operation of the indexing mechanism.

18. A metal working apparatus including a shiftable work supporting carrier, an actuator for shifting said carrier, a shiftable spindle supporting carriage operatively associated with said work carrier, a cutter carrying spindle on said carriage, means for driving said spindle, means for imparting movement to said spindle supporting carriage, clamping mechanism for positively securing a work part in position upon said work carrier, a control determinative for governing the starting, direction, and speed of actuation of said spindle carriage and the starting and speed of rotation of the spindle carried thereby, magnetic actuators for governing the functioning of said control determinative, a second control determinative including dog arrangement shiftable in synchronism with the work holding carrier for governing the starting, direction and speed of actuation of the work carrier, and the functioning of said clamping mechanism, magnetic actuators for controlling the functioning of said second control determinative, and electrical contactors responsive to fluid pressure in the clamping mechanism for governing the energizing of a selected number of said magnetic actuators.

19. In a boring machine, a rotary boring spindle, a work support, means including a hydraulic actuator for causing relative movement between the spindle and support, pump mechanism for delivering fluid to said actuator, a prime mover comprising a reversible electric motor for imparting rotation to said spindle, control means for effecting the automatic stopping of said prime mover by connecting said motor in reverse for a period which is sufficient to arrest forward rotation of the spindle, indexing means for the spindle, means controlled by the mode of movement of the spindle in connection with the indexing thereof for controlling the indexing mechanism, and means for effecting relative lateral movement between the work support and boring spindle to permit relative axial movement thereof when the spindle has been indexed and rotation of the spindle has been arrested.

20. In a boring machine, a rotary boring spindle, a work support, means including a hydraulic actuator for causing relative movement between the spindle and support, pump mechanism for delivering fluid to said actuator, a prime mover comprising a reversible electric motor for imparting rotation to said spindle, control means for effecting the automatic stopping of said prime mover by connecting said motor in reverse for a period which is sufficient to arrest forward rotation of the spindle, indexing mechanism for the spindle, means controlled by the mode of movement of the spindle in connection with the indexing thereof for controlling the indexing mechanism, means for effecting relative lateral movement between the work support and boring spindle to permit relative axial movement thereof when the spindle has been indexed and rotation of the spindle has been arrested, and voltage control means for governing the amount of reverse voltage experienced by said motor.

21. In a boring machine, a rotary boring spindle having a boring tool projecting laterally therefrom, a work support, means including a hydraulic actuator for causing relative movement between the spindle and support, pump mechanism for delivering fluid to said actuator, a prime mover comprising a reversible electric motor for imparting rotation to said spindle, interconnected hydraulic and electric control means for applying reverse current to the motor for effecting the automatic stopping of said prime mover in timed relation with the relative movement between the spindle and the support, indexing means for the spindle, and means for effecting relative lateral movement between the boring spindle and work support to permit clearance of the boring tool and work during relative axial movement thereof for withdrawing the boring spindle when the spindle has been indexed and said prime mover has been stopped.

22. In a boring machine a rotary boring spindle, a boring tool carried by said spindle having a radially projecting cutter element, a work support, means including a hydraulic actuator for causing relative movement between the spindle and support, pump mechanism for delivering fluid to said actuator, a prime mover comprising a reversible electric motor for imparting rotation to said spindle, control means for effecting the automatic stopping of said prime mover by connecting said motor in reverse for a period which is sufficient to arrest forward rotation of the motor, indexing means for insuring the stopping of the spindle so as to position the radially extending cutter in a predetermined relation with respect to a supported work piece, electric switch means operated substantially at the instant of reversal of the spindle for controlling the indexing mechanism, and means for effecting relative lateral movement between the work support and boring spindle to permit relative axial movement thereof when said spindle has been indexed and rotation of the spindle has been arrested.

23. In a boring machine, a plurality of rotary boring spindles, a boring tool projecting laterally from each of said spindles, a work support, means for procuring relative reciprocative movement between the support and the spindles parallel with the axis of said spindles, power means for the machine comprising a plurality of electrical motors, means for stopping the rotation of said spindles with the tool of each spindle projecting in a predetermined direction, means for procuring relative transverse movement between the spindles and support in a direction such that the spindle axis is displaced from the axis of the bore of the work-piece in a direction opposite the projection of the tool, means controlling the two last said means whereby the tool passes through the finished bore without contacting same, and interlocking means between said motors to prevent relative shifting of the work carrier and spindles parallel to the axis of said spindles before all of the spindles are in an indexed position.

24. In a boring machine, a plurality of rotary boring spindles, a boring tool projecting laterally from each of said spindles, a work support, means for procuring relative reciprocative movement between the support and the spindles parallel with the axis of said spindles, power means for the machine comprising a plurality of electrical motors, means for stopping the rotation of said spindles with the tool of each spindle projecting in a predetermined direction, means for procuring relative transverse movement between the spindles and support in a direction such that the spindle axis is displaced from the axis of the bore of the work-piece in a direction opposite the projection of the tool, means controlling the two last said means whereby the tool passes through the finished bore without contacting same, a plurality of oppositely disposed carriages for supporting said spindles in oppositely disposed relation, and interlocking means between said motors whereby to prevent relative shifting of said work carriage and said spindles before said spindles are in a predetermined indexed position.

25. A metal working apparatus including a shiftable tunnel type work supporting carrier, a hydraulic actuator for shifting said carrier, a hydraulic power clamping mechanism including a hydraulic actuator coupled with a plurality of equalizing clamping members shiftably supported by said work supporting carrier, a fluid power generating unit associated with said work clamping and work shifting structures adapted to supply fluid under pressure for propelling and clamping purposes, control means for initiating and governing the shifting of said work supporting carrier, and electrically responsive means associated with said hydraulic clamping actuator and operable in accordance with a predetermined position of said clamping members and in accordance with a predetermined pressure within said clamping actuator for rendering said control means functionally operable.

26. A metal working apparatus including a shiftable tunnel type work supporting carrier, a hydraulic actuator for shifting said carrier, a hydraulic power clamping mechanism including a hydraulic actuator coupled with a plurality of equalizing clamping members shiftably supported by said work supporting carrier, the clamping cylinders of said clamping mechanism being so disposed upon said carrier as to enable a plurality of metal removing tools to engage a supported work-piece from opposite sides thereof, a fluid power generating unit associated with said work-clamping and work-shifting structures adapted to supply fluid under pressure for propelling and clamping purposes, control means for initiating and governing the shifting of said work supporting carrier, and electrically responsive means associated with said hydraulic clamping actuator and operable in accordance with a predetermined position of said clamping members and in accordance with a predetermined pressure within said clamping actuator for rendering said control means functionally operable.

27. In a boring machine, a rotary spindle adapted to carry a laterally projecting boring cutter, an electric motor for rotating said spindle, a shiftable work support adapted to carry a work piece having a cylindrical surface to be machined by the cutter, a first hydraulic actuator for reciprocating the spindle axially toward and away from the work support, pumping means for propelling said actuator at feeding and rapid traverse rates, shiftable valve means for controlling the movements and speed of travel of said actuator, a second hydraulic actuator operable to shift the work support transversely of the axis of the cylindrical surface of the work piece from a position wherein the axis of the cylindrical surface is in alinement with the spindle axis to a position offset therefrom when the first actuator reaches the end of its feeding movement, electric control and circuit means for directing current in a given direction to said motor when said first hydraulic actuator is in a feeding position, and means operable to index the spindle when the first actuator reaches the end of its feeding movement, said indexing means including control means for applying reverse current to said motor.

28. In a boring machine, a rotary spindle adapted to carry a laterally projecting boring cutter, an electric motor for rotating said spindle, a shiftable work support adapted to carry a work piece having a cylindrical surface to be machined by the cutter, a first hydraulic actuator for reciprocating the spindle axially toward and away from the work support, pumping means for propelling said actuator at feeding and rapid traverse rates, shiftable valve means for controlling the movements and speed of travel of said actuator, a second hydraulic actuator operable to shift the work support transversely of the axis of the cylindrical surface of the work piece from a position wherein the axis of the cylindrical surface is in alinement with the spindle axis to a position offset therefrom when the first actuator reaches the end of its feeding movement, electric control and circuit means for directing current in a given direction to said motor when said first hydraulic actuator is in a feeding position, and means operable to index the spindle when the first actuator reaches the end of its feeding movement, said indexing means including control means for applying reverse current to said motor, and means for reducing the voltage of said reverse current.

29. In a boring machine, a rotary spindle adapted to carry a laterally projecting boring cutter, an electric motor for rotating said spindle, a shiftable work support adapted to carry a work piece having a cylindrical surface to be machined by the cutter, a first hydraulic actuator for reciprocating the spindle axially toward and away from the work support, pumping means for propelling said actuator at feeding and rapid traverse rates, shiftable valve means for controlling the movements and speed of travel of said actuator, a second hydraulic actuator operable to shift the work support transversely of the axis of the cylindrical surface of the work piece from a position wherein the axis of the cylindrical surface is in alinement with the spindle axis to a position offset therefrom when the first actuator reaches the end of its feeding movement, electric control and circuit means for directing current in a given direction to said motor when said first hydraulic actuator is in a feeding position, and means operable to index the spindle when the first actuator reaches the end of its feeding movement, said indexing means including control means for applying reverse current to said motor, and a control switch operated by the mode of rotation of the spindle in connection with the indexing thereof.

30. In a boring machine, a rotary spindle adapted to carry a laterally projecting boring cutter, an electric motor for rotating said spindle, a shiftable work support adapted to carry a work piece having a cylindrical surface to be machined by the cutter, a first hydraulic actuator for reciprocating the spindle axially toward and away from the work support, pumping means for propelling said actuator at feeding and rapid traverse rates, shiftable valve means for controlling the movements and speed of travel of said actuator, a second hydraulic actuator operable to shift the work support transversely of the axis of the cylindrical surface of the work piece from a position wherein the axis of the cylindrical surface is in alinement with the spindle axis to a position offset therefrom when the first actuator reaches the end of its feeding movement, electric control and circuit means for directing current in a given direction to said motor when said first hydraulic actuator is in a feeding position, and means operable to index the spindle when the first actuator reaches the end of its feeding movement, said indexing means including control means for applying reverse current to said motor, and stop means for positioning the spindle and deenergizing the motor controlled by the mode of rotation of the spindle in connection with the indexing thereof.

31. In a hydraulic machine tool, a supporting frame structure, a hydraulic power generating unit, a tool spindle supporting carriage, said carriage and frame structure being relatively shiftable, a fluid motor for imparting said relative shifting between the carriage and supporting frame, a control valve for controlling the operation of said motor, manifold means having a plurality of pipeless fluid channels positioned between said fluid power generating unit and said control valve arranged for connection with fluid conduits in the fluid power generating unit and the control valve, and end sealing means for said channels comprising an enlarged recess formed at the end of the channel at the point of juncture between the channel end and the associated connected conduit, and sealing mechanism disposed within said recess for effecting a fluid-tight connection between the channel end and said associated connected conduit.

32. In a hydraulic machine tool, a supporting frame structure, a hydraulic power generating unit, a tool spindle supporting carriage, said carriage and frame structure being relatively shiftable, a fluid motor for imparting said relative shifting between the carriage and supporting frame, a control valve for controlling the operation of said motor, manifold means having a plurality of pipeless fluid channels positioned between said fluid power generating unit and said control valve arranged for connection with fluid conduits in the fluid power generating unit and the control valve, said manifold means comprising an integral block detachable as a unit from the fluid power generating unit and the control valve, and end sealing means for said channels comprising an enlarged recess formed at the end of the channel at the point of juncture between the channel end and the associated connected conduit, and sealing mechanism disposed within said recess for effecting a fluid-tight connection between the channel end and said associated connected conduit.

33. In a hydraulic machine tool, a supporting frame structure, a hydraulic power generating unit, a tool spindle supporting carriage, said carriage and frame structure being relatively shiftable, a fluid motor for imparting said relative shifting between the carriage and supporting frame, a control valve for controlling the operation of said motor, manifold means having a plurality of pipeless fluid channels positioned between said fluid power generating unit and said control valve arranged for connection with fluid conduits in the fluid power generating unit and the control valve, and end sealing means for said channels comprising an enlarged recess formed at the end of the channel at the point of juncture between the channel end and the associated connected conduit, and sealing mechanism comprising a pair of complementary sealing members disposed within said recess for effecting a fluid-tight connection between the channel end and said associated connected conduit.

34. In apparatus for hydraulic actuation, a fluid power generating unit, a cooperable fluid transmitting element, a fluid conveying manifold device interconnecting said fluid power generating unit and said cooperable fluid transmitting element, said manifold having a fluid conveying channel, and end sealing means for said channel comprising a pair of members having complementary inclined mating surfaces so constructed as to be urged into a fluid-tight fit when said fluid transmitting element and manifold are secured together.

35. In apparatus for hydraulic actuation, a fluid power generating unit, a cooperable fluid transmitting element, a fluid conveying manifold device interconnecting said fluid power generating unit and said cooperable fluid transmitting element, said manifold having a fluid conveying channel, an enlarged annular recess formed at the end of said fluid conveying channel, and end sealing means for said channel comprising a pair of members disposed in said annular recess and having complementary inclined mating surfaces so constructed as to be urged into a fluid-tight fit when said fluid transmitting element and manifold are secured together.

36. In apparatus for hydraulic actuation, a fluid power generating unit, a cooperable fluid transmitting element, a fluid conveying manifold device interconnecting said fluid power generating unit and said cooperable fluid transmitting element, said manifold having a fluid conveying channel, end sealing means for said channel comprising a pair of members having complementary inclined mating surfaces so constructed as to be urged into a fluid-tight fit when said fluid transmitting element and manifold are secured together, and a cylindrical member disposed within said pair of members and providing internal support therefor.

37. In apparatus for hydraulic actuation, a fluid power generating unit, a cooperable fluid transmitting element, a fluid conveying manifold device interconnecting said fluid power generating unit and said cooperable fluid transmitting element, said manifold having a fluid conveying channel, an enlarged annular recess formed at the end of said fluid conveying channel, end sealing means for said channel comprising a pair of members disposed in said annular recess and having complementary inclined mating surfaces so constructed as to be urged into a fluid-tight fit when said fluid transmitting element and manifold are secured together, and a cylindrical member disposed within said pair of members and providing internal support therefor.

38. A metal working apparatus including a spindle supporting carriage, a cutter carrying spindle mounted on said carriage, an electric motor coupled with said spindle, means for supplying current to the motor, means coupling said electric motor with the current supplying means, control means including contactors for controlling the direction, starting and stopping of said motor, shiftable means for shifting the contactors, indexing mechanism for indexing said spindle, and means controlled by the mode of movement of the spindle in connection with the indexing thereof for controlling the indexing mechanism.

39. A metal working apparatus including a spindle supporting carriage, a cutter carrying spindle mounted on said carriage, an electric motor coupled with said spindle, means for supplying current to the motor, means coupling said electric motor with the current supplying means, control means including contactors for controlling the direction, starting and stopping of said motor, shiftable means for shifting the contactors, indexing mechanism for indexing said spindle including means for applying current to the motor tending to rotate the motor in a reverse direction, and means controlled by the mode of movement of the spindle in connection with the indexing thereof for controlling the indexing mechanism.

40. A metal working apparatus including a spindle supporting carriage, a cutter carrying spindle mounted on said carriage, an electric motor coupled with said spindle, means for supplying current to the motor, means coupling said electric motor with the current supplying means, control means including contactors for controlling the direction, starting and stopping of said motor, shiftable means for shifting the contactors, indexing mechanism including a mechanical positioning latch member for indexing said spindle, and means controlled by the mode of movement of the spindle in connection with the indexing thereof for controlling the indexing mechanism.

41. A metal working apparatus including a spindle supporting carriage, a cutter carrying spindle mounted on said carriage, an electric motor coupled with said spindle, means for supplying current to the motor, means coupling said electric motor with the current supplying means, control means including contactors for controlling the direction, starting and stopping of said motor, shiftable means for shifting the contactors, indexing mechanism including a mechanical positioning latch member for indexing said spindle, means controlled by the mode of movement of the spindle in connection with the indexing thereof for controlling the indexing mechanism, and interlock means controlled by the movement of said latch member into indexing position.

42. In a boring machine, a rotary boring spindle, a work support, an actuator for causing relative movement between the spindle and support axially of the spindle, a prime mover comprising an electric motor for imparting rotation to said spindle, control means for effecting the stopping of said prime mover to arrest forward rotation of the spindle, indexing mechanism for the spindle, means controlled by the mode of movement of the spindle in connection with the indexing thereof for controlling the indexing mechanism, and means for effecting relative lateral movement between the work support and the boring spindle to permit relative axial movement thereof when the spindle has been indexed and rotation of the spindle has been arrested.

43. In a boring machine, a rotary boring spindle, a work support, an actuator for causing relative movement between the spindle and support axially of the spindle, a prime mover comprising an electric motor for imparting rotation to said spindle, control means for effecting the stopping of said prime mover to arrest forward rotation of the spindle, indexing mechanism including a mechanical positioning latch member for the spindle, means controlled by the mode of movement of the spindle in connection with the indexing thereof for controlling the indexing mechanism, means for effecting relative lateral movement between the work support and the boring spindle to permit relative axial movement thereof when the spindle has been indexed and rotation of the spindle has been arrested, and interlock means controlled by said mechanical latch member for preventing operation of the lateral movement means if the latch member is not in indexing position.

ERNEST J. SVENSON.

Certificate of Correction

Patent No. 2,395,518.

February 26, 1946.

ERNEST J. SVENSON

It is hereby certified that errors appear in the printed specification of the above numbered patent requiring correction as follows: Page 2, second column, line 1, for the word "on" read *of*; page 11, second column, line 72, for the patent number "2,214,257" read *2,215,257*; page 12, first column, line 27, for "relays" read *relay*; line 28, for "22" read *622*; and second column, line 9, for "thorugh" read *through*; page 16, first column, line 16, for "felt" read *left*; and that the said Letters Patent should be read with these corrections therein that the same may conform to the record of the case in the Patent Office.

Signed and sealed this 10th day of December, A. D. 1946.

[SEAL]

LESLIE FRAZER,
*First Assistant Commissioner of Patents.* an electric motor for imparting rotation to said spindle, control means for effecting the stopping of said prime mover to arrest forward rotation of the spindle, indexing mechanism for the spindle, means controlled by the mode of movement of the spindle in connection with the indexing thereof for controlling the indexing mechanism, and means for effecting relative lateral movement between the work support and the boring spindle to permit relative axial movement thereof when the spindle has been indexed and rotation of the spindle has been arrested.

43. In a boring machine, a rotary boring spindle, a work support, an actuator for causing relative movement between the spindle and support axially of the spindle, a prime mover comprising an electric motor for imparting rotation to said spindle, control means for effecting the stopping of said prime mover to arrest forward rotation of the spindle, indexing mechanism including a mechanical positioning latch member for the spindle, means controlled by the mode of movement of the spindle in connection with the indexing thereof for controlling the indexing mechanism, means for effecting relative lateral movement between the work support and the boring spindle to permit relative axial movement thereof when the spindle has been indexed and rotation of the spindle has been arrested, and interlock means controlled by said mechanical latch member for preventing operation of the lateral movement means if the latch member is not in indexing position.

ERNEST J. SVENSON.

Certificate of Correction

Patent No. 2,395,518. February 26, 1946.

ERNEST J. SVENSON

It is hereby certified that errors appear in the printed specification of the above numbered patent requiring correction as follows: Page 2, second column, line 1, for the word "on" read *of*; page 11, second column, line 72, for the patent number "2,214,257" read *2,215,257*; page 12, first column, line 27, for "relays" read *relay*; line 28, for "22" read *622*; and second column, line 9, for "thorugh" read *through*; page 16, first column, line 16, for "felt" read *left*; and that the said Letters Patent should be read with these corrections therein that the same may conform to the record of the case in the Patent Office.

Signed and sealed this 10th day of December, A. D. 1946.

[SEAL]

LESLIE FRAZER,
*First Assistant Commissioner of Patents.*